US008812322B2

(12) United States Patent
Mysore et al.

(10) Patent No.: US 8,812,322 B2
(45) Date of Patent: Aug. 19, 2014

(54) SEMI-SUPERVISED SOURCE SEPARATION USING NON-NEGATIVE TECHNIQUES

(75) Inventors: Gautham J. Mysore, San Francisco, CA (US); Paris Smaragdis, Urbana, IL (US)

(73) Assignee: Adobe Systems Incorporated, San Jose, CA (US)

( * ) Notice: Subject to any disclaimer, the term of this patent is extended or adjusted under 35 U.S.C. 154(b) by 623 days.

(21) Appl. No.: 13/118,178

(22) Filed: May 27, 2011

(65) Prior Publication Data

US 2013/0132077 A1 May 23, 2013

(51) Int. Cl.
*G10L 15/14* (2006.01)

(52) U.S. Cl.
USPC .......................................................... 704/256.2

(58) Field of Classification Search
USPC ....................................... 704/233, 256–256.6
See application file for complete search history.

(56) References Cited

U.S. PATENT DOCUMENTS

| | | | | |
|---|---|---|---|---|
| 7,454,333 | B2 * | 11/2008 | Ramakrishnan et al. | 704/228 |
| 2003/0212556 | A1 * | 11/2003 | Nefian | 704/256 |
| 2004/0117186 | A1 * | 6/2004 | Ramakrishnan et al. | 704/255 |
| 2008/0300879 | A1 * | 12/2008 | Bouchard et al. | 704/256 |

* cited by examiner

*Primary Examiner* — Abul Azad
(74) *Attorney, Agent, or Firm* — Wolfe-SBMC

(57) ABSTRACT

Systems and methods for semi-supervised source separation using non-negative techniques are described. In some embodiments, various techniques disclosed herein may enable the separation of signals present within a mixture, where one or more of the signals may be emitted by one or more different sources. In audio-related applications, for instance, a signal mixture may include speech (e.g., from a human speaker) and noise (e.g., background noise). In some cases, speech may be separated from noise using a speech model developed from training data. A noise model may be created, for example, during the separation process (e.g., "on-the-fly") and in the absence of corresponding training data.

20 Claims, 17 Drawing Sheets

SEMI-SUPERVISED SOURCE SEPARATION USING NON-NEGATIVE TECHNIQUES

BACKGROUND

This specification relates to signal processing, and, more particularly, to systems and methods for semi-supervised source separation using non-negative techniques.

Statistical signal modeling is a challenging technical field, particularly when it deals with mixed signals—i.e., signals produced by two or more sources. In audio processing, for example, most sounds may be treated as a mixture of various sound sources. For example, recorded music typically includes a mixture of overlapping parts played with different instruments. Also, in social environments, multiple people often tend to speak concurrently—referred to as the "cocktail party effect." In fact, even so-called single sources can actually be modeled a mixture of sound and noise.

The human auditory system has an extraordinary ability to differentiate between constituent sound sources. This basic human skill remains, however, a difficult problem for computers.

SUMMARY

The present specification is related to systems and methods for semi-supervised source separation using non-negative techniques. In some embodiments, certain techniques disclosed herein may enable the separation of a signal's various components that are attributable to different sources. For example, in some cases an acoustic or audio signal may include a combination of speech (i.e., a "signal of interest" or "selected signal") and noise (i.e., "other signal(s)"). In those cases, the techniques disclosed herein may enable the separation of speech from noise (i.e., "denoising") or the like. More generally, however, any two or more signals (other than speech and noise) may be separated.

In some embodiments, systems and methods may provide semi-supervised source or signal separation techniques that may be applied to a mixed or mixture signal. The mixed signal may include a signal of interest as well as other signal(s). In some cases, the signal of interest may be modeled as having been emitted by a given source, while the other signal(s) may be modeled as having been emitted by another source(s). For instance, the signal of interest may be modeled using a non-negative hidden Markov (N-HMM) source model that includes multiple non-negative dictionaries and a Markov chain. As such, the N-HMM source model is configured to model the spectral structure and temporal dynamics of the signal of interest. The signal of interest may then be separated from the other signal(s) by creating a mask using a non-negative factorial hidden Markov model (N-FHMM) and then applying the mask to the mixture signal. Once separated from the other signal(s), the signal of interest may be independently processed.

Moreover, whereas the N-HMM source model for the signal of interest may be generated based, at least in part, on training data, a model for the other signal(s) may be learned during the separation process (i.e., "on-the-fly") and in the absence of corresponding training data.

Figure 1:
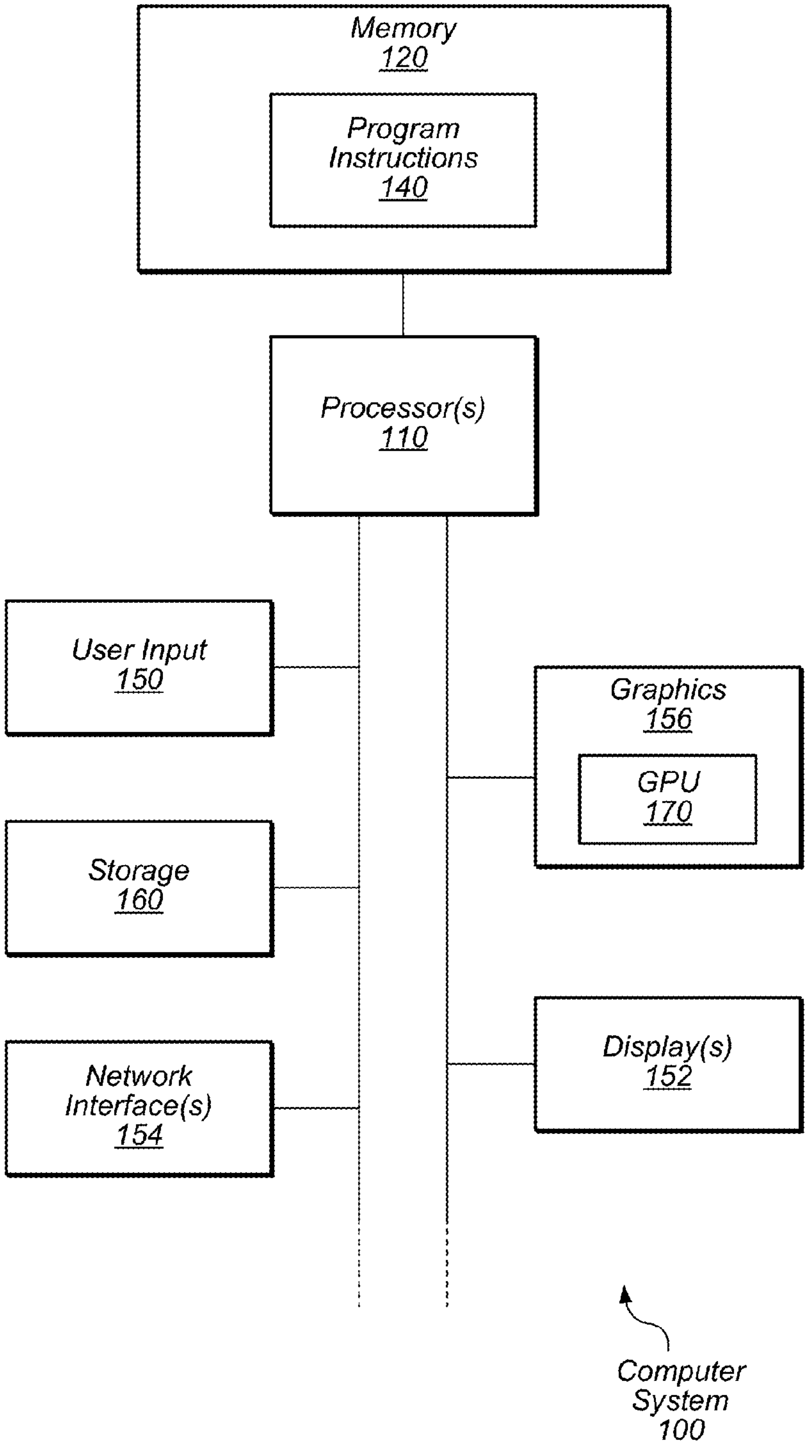
FIG. 1 is a block diagram of an illustrative computer system or device configured to implement some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. The headings used herein are for organizational purposes only and are not meant to be used to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION OF EMBODIMENTS

Introduction

This specification first presents an illustrative computer system or device, as well as an illustrative signal analysis module that may implement certain embodiments of methods disclosed herein. The specification then discloses techniques for modeling signals originated from single sources, followed by techniques for modeling signals originated from multiple sources. Various examples and applications for each modeling scenario are also discussed. Then, semi-supervised source separation using non-negative techniques are disclosed. Some of these techniques may be implemented, for example, by a signal analysis module or computer system.

In some embodiments, these techniques may be used in music recording and processing, source extraction, noise reduction, teaching, automatic transcription, electronic games, audio search and retrieval, and many other applications. Although certain embodiments and applications discussed herein are in the field of audio, it should be noted that the same or similar principles may also be applied in other fields.

Throughout the specification, the term “signal” may refer to a physical signal (e.g., an acoustic signal) and/or to a representation of a physical signal (e.g., an electromagnetic signal representing an acoustic signal). In some embodiments, a signal may be recorded in any suitable medium and in any suitable format. For example, a physical signal may be digitized, recorded, and stored in computer memory. The recorded signal may be compressed with commonly used compression algorithms. Typical formats for music or audio files may include WAV, OGG, RIFF, RAW, AU, AAC, MP4, MP3, WMA, RA, etc.

The term “source” refers to any entity (or type of entity) that may be appropriately modeled as such. For example, a source may be an entity that produces, interacts with, or is otherwise capable of producing or interacting with a signal. In acoustics, for example, a source may be a musical instrument, a person’s vocal cords, a machine, etc. In some cases, each source—e.g., a guitar—may be modeled as a plurality of individual sources—e.g., each string of the guitar may be a source. In other cases, entities that are not otherwise capable of producing a signal but instead reflect, refract, or otherwise interact with a signal may be modeled a source—e.g., a wall or enclosure. Moreover, in some cases two different entities of the same type—e.g., two different pianos—may be considered to be the same “source” for modeling purposes.

The term “mixed signal,” “mixture,” or “sound mixture” refers to a signal that results from a combination of signals originated from two or more sources into a lesser number of channels. For example, most modern music includes parts played by different musicians with different instruments. Ordinarily, each instrument or part may be recorded in an individual channel. Later, these recording channels are often mixed down to only one (mono) or two (stereo) channels. If each instrument were modeled as a source, then the resulting signal would be considered to be a mixed signal. It should be noted that a mixed signal need not be recorded, but may instead be a “live” signal, for example, from a live musical performance or the like. Moreover, in some cases, even so-called “single sources” may be modeled as producing a “mixed signal” as mixture of sound and noise.

Furthermore, in some cases a mixed signal may include a combination of a signal of interest (or a “selected signal”) and other signals. In some audio-related embodiments, for example, the signal of interest may include a speech signal and the other signals may include some form of noise (e.g., background noise). In other audio-related embodiments, however, the signal of interest may include any other type of signal such as, for example, a musical piece of the like. Generally speaking, “noise” may include any type of signal other than the signal of interest, including, for instance, sounds generated by weather conditions (e.g., rain, wind, etc.), animals, machines, other people (i.e., other than the person(s) generating the signal of interest), electrical devices, or the like.

In the following detailed description, numerous specific details are set forth to provide a thorough understanding of claimed subject matter. However, it will be understood by a person of ordinary skill in the art in light of this specification that claimed subject matter may be practiced without necessarily being limited to these specific details. In some instances, methods, apparatuses or systems that would be known by a person of ordinary skill in the art have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as “processing,” “computing,” “calculating,” “determining” or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

A Computer System or Device

FIG. 1 is a block diagram showing elements of an illustrative computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In some embodiments, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In an embodiment, one or more display devices 152 may be coupled to the graphics component 156 for display of data provided by the graphics component 156.

In some embodiments, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

A Signal Analysis Module

Figure 2:
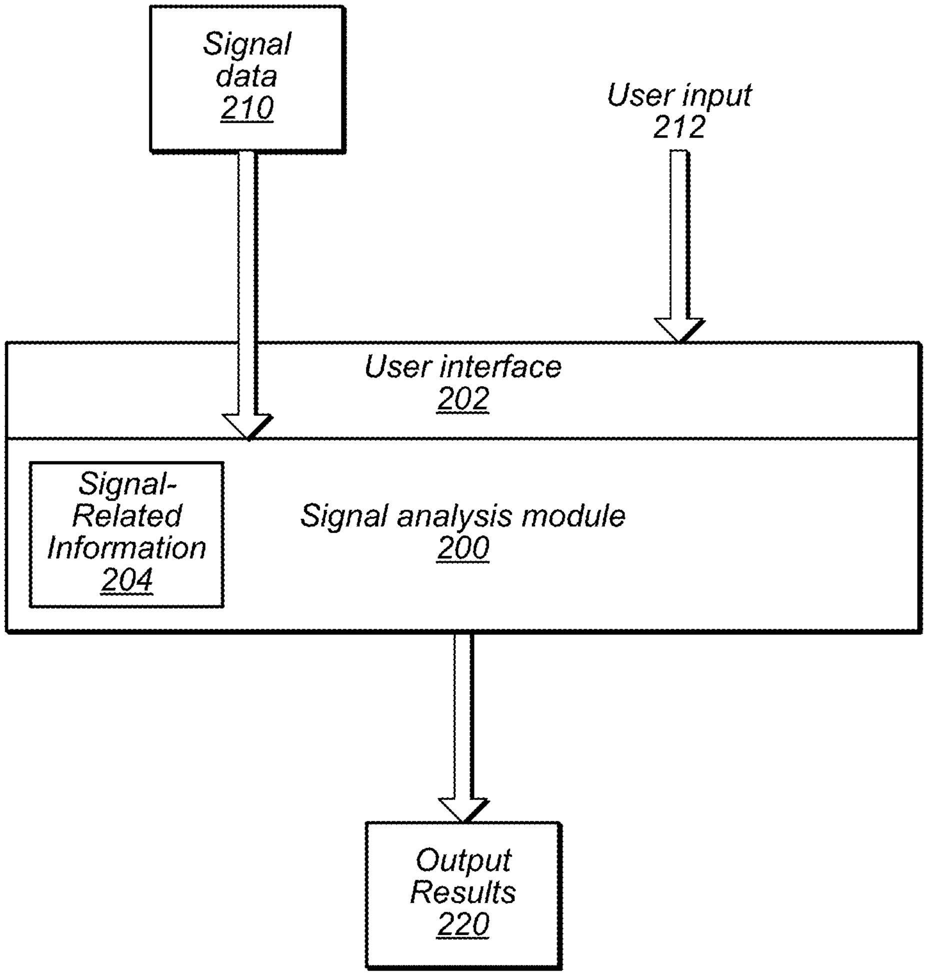
FIG. 2 is a block diagram of an illustrative signal analysis module according to some embodiments.

In some embodiments, a signal analysis module may be implemented by processor-executable instructions (e.g., instructions 140) stored on a medium such as memory 120 and/or storage device 160. FIG. 2 shows an illustrative signal analysis module that may implement certain embodiments disclosed herein. In some embodiments, module 200 may provide a user interface 202 that includes one or more user interface elements via which a user may initiate, interact with, direct, and/or control the method performed by module 200. Module 200 may be operable to obtain digital signal data for a digital signal 210, receive user input 212 regarding the signal data, analyze the signal data and/or the input, and output analysis results for the signal data 220. In an embodiment, the module may include or have access to additional or auxiliary signal-related information 204—e.g., a collection of representative signals, model parameters, etc.

Signal analysis module 200 may be implemented as or in a stand-alone application or as a module of or plug-in for a signal processing application. Examples of types of applications in which embodiments of module 200 may be implemented may include, but are not limited to, signal (including sound) analysis, characterization, search, processing, and/or presentation applications, as well as applications in security or defense, educational, scientific, medical, publishing, broadcasting, entertainment, media, imaging, acoustic, oil and gas exploration, and/or other applications in which signal analysis, characterization, representation, or presentation may be performed. Specific examples of applications in which embodiments may be implemented include, but are not limited to, Adobe® Soundbooth® and Adobe® Audition®. Module 200 may also be used to display, manipulate, modify, classify, and/or store signals, for example to a memory medium such as a storage device or storage medium.

Single Sources

In some embodiments, signal analysis module 200 may implement a single source model such as described in this section. In recent years, there has been a great deal of work in modeling audio using non-negative matrix factorization and its probabilistic counterparts. Given a sound source, these algorithms learn a dictionary of spectral vectors to best explain it. However, this dictionary learned in a manner that disregards a very important aspect of sound—i.e., its temporal structure. This portion of the specification discloses a non-negative hidden Markov model (N-HMM) that addresses this and other issues. In some embodiments, the N-HMM model jointly learns several spectral dictionaries as well as a Markov chain that describes the structure of changes between these dictionaries.

In the sections that follow, an overview of an N-HMM-based method is presented and an N-HMM model is disclosed. N-HMM parameter estimation, model selection, and N-HMM modeling examples are then addressed. Finally, some illustrative applications in the field of audio processing are discussed.

Overview of an N-HMM-Based Method

Figure 3:
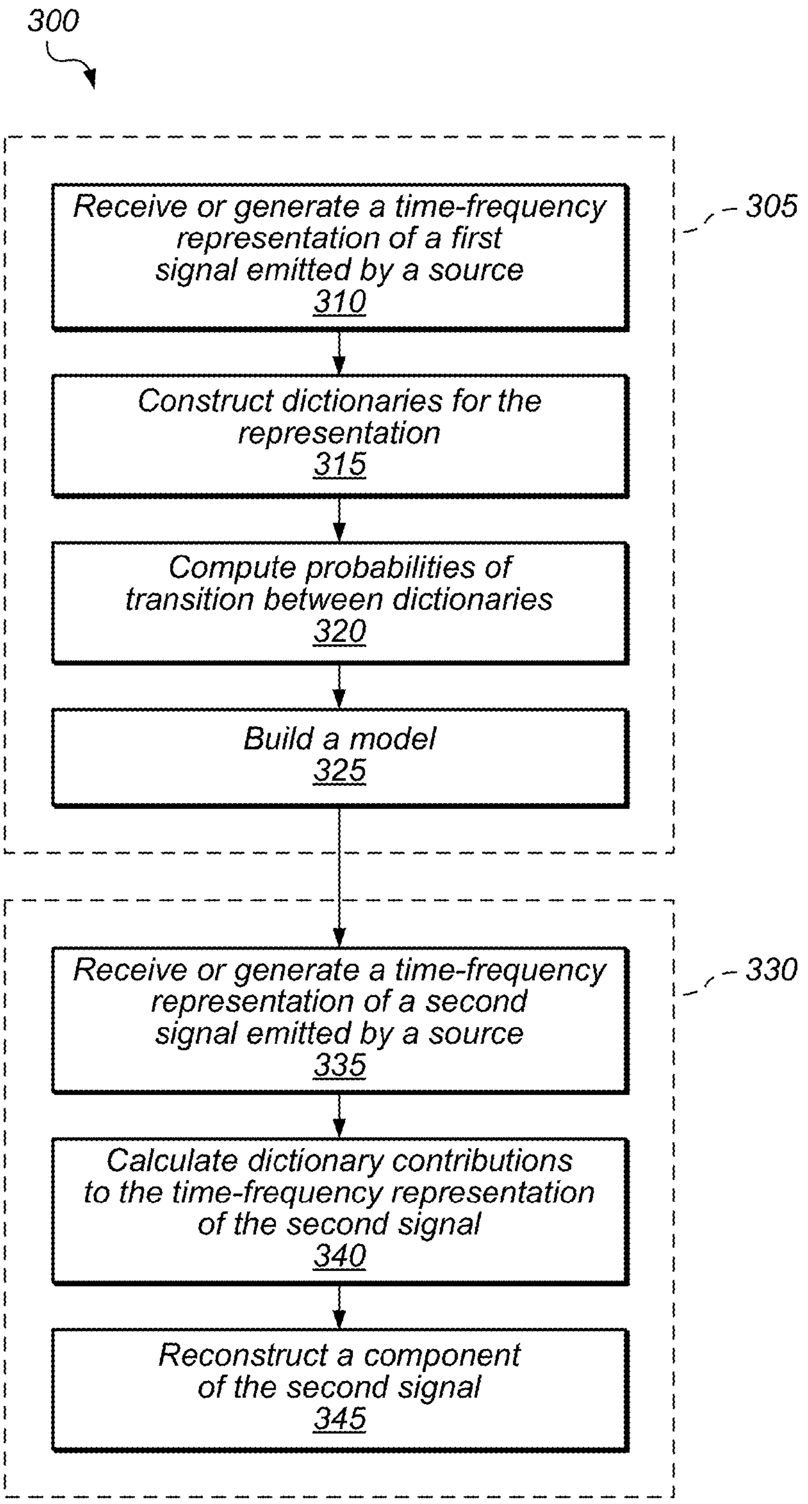
FIG. 3 is a flowchart of a method for a non-negative hidden Markov model (N-HMM) of a single source according to some embodiments.

Referring to FIG. 3, a flowchart of method 300 for a non-negative hidden Markov model (N-HMM) for a single source is depicted according to some embodiments. For example, N-HMM method 300 may be performed, at least in part, by signal analysis module 200 of FIG. 2. Generally, N-HMM method 300 may be split into two stages: training stage 305 and application (or evaluation) stage 330. Although N-HMM method 300 is illustrated showing application stage 330 immediately following training stage 305, it should be noted that these stages may be independently performed at different times and by different entities. In some implementations, training stage 305 may take place "offline" based on training data, and application stage 330 may be executed "online" based on data desired to be processed. In other implementations, both training stage 305 and application stage 330 may be executed online.

At 310 of training phase 305, N-HMM method 300 receives and/or generates a spectrogram of a first signal emitted by a source. The signal may be a previously recorded training signal. Additionally or alternatively, the signal may be a portion of a live signal being received at signal analysis module 200. The signal may be the same signal that will be processed in application stage 335 or an entirely different signal, whether live or pre-recorded.

In some embodiments, the spectrogram may be a spectrogram generated, for example, as the magnitude of the short time Fourier transform (STFT) of a signal. Furthermore, the source may be any source suitable for modeling as a single source. The decision of whether to model a signal as having been originated by a single source or by multiple sources may be a design choice, and may vary depending upon the application.

At 315, N-HMM method 300 may construct two or more dictionaries to explain the spectrogram such that a given time frame of the spectrogram may be explained mainly by a single dictionary. In this case, multiple segments in different parts of the spectrogram may be explained by the same dictionary. Additionally or alternatively, method 300 may construct a dictionary for each segment of the spectrogram. The various segments may be, for example, time frames of the spectrogram. Further, each dictionary may include at least one spectral component of the spectrogram. Particularly in acoustic applications, this operation may allow an N-HMM model to account for the non-stationarity of audio by collecting multiple sets of statistics over a given spectrogram, rather than amalgamating the statistics of the entire spectrogram into one set. Each segment of the spectrogram may be represented by a linear combination of spectral components of a single dictionary. In some embodiments, the number of dictionaries and the number of spectral components per dictionary may be user-selected. Additionally or alternatively, these variables may be automatically selected based on an optimization algorithm or the like.

As shown in operations 310 and 315, an N-HMM method 300 may involve constructing dictionaries for a spectrogram. The spectrogram of a sound source may be viewed as a histogram of "sound quanta" across time and frequency. Each column of a spectrogram is the magnitude of the Fourier transform over a fixed window of an audio signal. As such, each column describes the spectral content for a given time frame. In some embodiments, the spectrogram may be modeled as a linear combination of spectral vectors from a dictionary using a factorization method.

In some embodiments, a factorization method may include two sets of parameters. A first set of parameters, $P(f|z)$, is a multinomial distribution of frequencies for latent component z, and may be viewed as a spectral vector from a dictionary. A second set of parameters, $P(z_t)$, is a multinomial distribution of weights for the aforementioned dictionary elements at time t. Given a spectrogram, these parameters may be estimated using an Expectation-Maximization (EM) algorithm or some other suitable algorithm.

Referring back to FIG. 3, at 320, N-HMM method 300 may compute probabilities of transitions between dictionaries. These probabilities may be expressed, for example, in the form of a transition matrix. And at 325, N-HMM method 300 may build a model based on the dictionaries and the probabilities of transition. In some embodiments, the model may also include parameters such as, for example, mixture weights, initial state probabilities, energy distributions, etc. These parameters may be obtained, for example, using an EM algorithm or some other suitable method as described in more detail below.

At 335 of application phase 330, N-HMM method 300 may receive a second signal. In some embodiments, the second signal may be the same signal received at operation 310—whether the signal is "live" or pre-recorded. In other embodiments, the second signal may be different from the first signal. Moreover, the source may be the same source, another instance of same type of source, or a source similar to the same source modeled at operation 325. Similarly as in operation 310, N-HMM method 300 may calculate a time-frequency representation or spectrogram of the second signal.

At 340, N-HMM method 300 then calculates a contribution of a given dictionary to time-frequency representation of the second signal based, at least in part, on the model built during training stage 305. Finally at 345, N-HMM method 300 reconstructs one or more signal components of second signal based, at least in part, on their individual contributions. In some embodiments, operation 345 reconstructs a signal component based on other additional model parameters such as, for example, mixture weights, initial state probabilities, energy distributions, etc.

As a result of operation 340, the various components of the second signal have now been individually identified, and as such may be separately processed as desired. Once one or more components have been processed, a subset (or all) of them may be once again combined to generate a modified signal. In the case of audio applications, for example, it may be desired to play the modified signal as a time-domain signal, in which case additional phase information may be obtained in connection with operation 335 to facilitate the transformation.

An N-HMM Model

Figure 4:
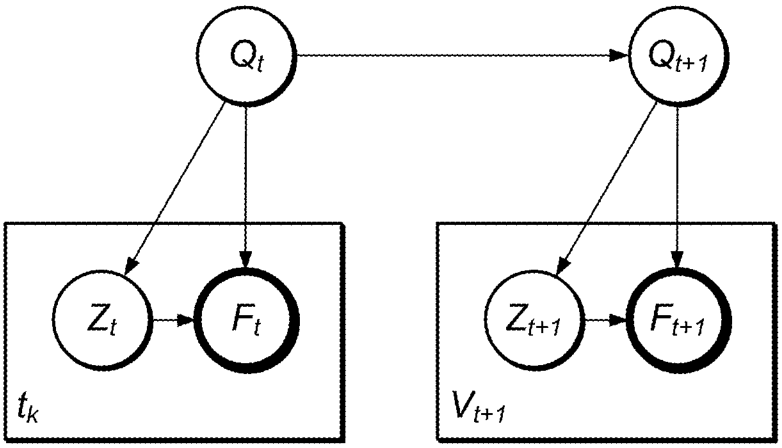
FIG. 4 is a graphical representation of an N-HMM model according to some embodiments.

Referring to FIG. 4, a graphical representation of an N-HMM model is depicted according to some embodiments. In this graphical representation, random variables are indicated by "nodes" and dependencies are indicated by arrows. The direction of an arrow indicates the direction of dependence of random variables. Nodes $F_t$ and $F_{t+1}$ represent observed random variables, while other nodes represent hidden random variables.

As illustrated, the model has a number of states, q, which may be interpreted as individual dictionaries. Each dictionary has two or more latent components, z, which may be interpreted as spectral vectors from the given dictionary. The variable F indicates a frequency or frequency band. The spectral vector z of state q may be defined by the multinomial distribution $P(f|z, q)$. It should be noted that there is a temporal aspect to the model, as indicated by t. In any given time frame, only one of the states is active. The given magnitude spectrogram at a time frame is modeled as a linear combination of the spectral vectors of the corresponding dictionary (or state) q. At time t, the weights are determined by the multinomial distribution $P(z_t|q_t)$.

In some embodiments, modeling a given time frame with one (of many) dictionaries rather than using a single large dictionary globally may address the non-stationarity of audio signals. For example, if an audio signal dynamically changes towards a new state, a new—and perhaps more appropriate—dictionary may be used. The temporal structure of these changes may be captured with a transition matrix, which may be defined by $P(q_{t+1}|q_t)$. The initial state probabilities (priors) may be defined by $P(q_1)$. A distribution of the energy of a given state may be defined as $P(v|q)$ and modeled as a Gaussian distribution.

Based on this model, an overall generative process may be as follows:

1. Set t=1 and choose a state according to the initial state distribution $P(q_1)$.
2. Choose the number of draws (energy) for the given time frame according to $P(v_t|q_t)$
3. Repeat the following steps $v_t$ times:
   (a) Choose a latent component according to $P(z_t|q_t)$.
   (b) Choose a frequency according to $P(f_t|z_t, q_t)$.
4. Transition to a new state $q_{t+1}$ according to $P(q_{t+1}|q_t)$
5. Set t=t+1 and go to step 2 if t<T.

Parameter Estimation and Reconstruction

Given the magnitude spectrogram $V_{ft}$ of a sound source, N-HMM may be learned using an EM algorithm or some other suitable technique. Using the EM algorithm for illustration purposes, the E operation may be computed as follows:

$$P(z_t, q_t \mid f_t, \overline{f}) = \frac{\alpha(q_t)\beta(q_t)}{\sum_{q_t} \alpha(q_t)\beta(q_t)} P(z_t \mid f_t, q_t) \quad \text{Equation (1)}$$

where $$P(z_t \mid f_t, q_t) = \frac{P(z_t \mid q_t)P(f_t \mid z_t, q_t)}{\sum_{z_t} P(z_t \mid q_t)P(f_t \mid z_t, q_t)} \quad \text{Equation (2)}$$

Because the magnitude spectrogram is modeled as a histogram, its entries should be integers. To account for this, in some embodiments, a scaling factor γ may be used. In Equation (1), $P(q_t, z_t|f_t,\overline{f})|$ is a posterior distribution used to estimate dictionary elements and weights vectors. Also, $\overline{f}|$ denotes the observations across all time frames—i.e., the entire spectrogram. It should be noted that $f_t$ is part of $\overline{f}|$. It is however mentioned separately to indicate that the posterior over $z_t$ and $q_t$ may be computed separately for each $f_t$.

Forward variables $\alpha(q_t)$ and backward variables $\beta(q_t)$ may be computed using the likelihoods of the data, $P(f_t|q_t)$, for each state. These likelihoods may then be computed as follows:

$$P(f_t \mid q_t) = \prod_{f_t} \left( \sum_{z_t} P(f_t \mid z_t, q_t) P(z_t \mid q_t) \right)^{\gamma V_{ft}} \quad \text{Equation (3)}$$

where $f_t$ represents the observations at time t, which is the magnitude spectrum at that time frame.

Dictionary elements and their respective weights may be estimated in the M operation of the EM algorithm as follows:

$$P(f \mid z, q) = \frac{\sum_t V_{ft} P(z_t, q_t \mid f_t, \overline{f})}{\sum_{f_t} \sum_t V_{ft} P(z_t, q_t \mid f_t, \overline{f})} \quad \text{Equation (4)}$$

$$P(z_t \mid q_t) = \frac{\sum_{f_t} V_{ft} P(z_t, q_t \mid f_t, \overline{f})}{\sum_{z_t} \sum_{f_t} V_{ft} P(z_t, q_t \mid f_t, \overline{f})} \quad \text{Equation (5)}$$

The transition matrix $P(q_{t+1}|q_t)$ and priors $P(q_1)$, as well as the mean and variance of P(v|q), may each be computed based on the data as in a typical hidden Markov model algorithm, which is well known in the art. The N-HMM model may then be interpreted as an HMM in which the observation model or emission probabilities $P(f_t|q_t)$ is a multinomial mixture model:

$$P(f_t \mid q_t) = \sum_{z_t} P(f_t \mid z_t, q_t) P(z_t \mid q_t) \quad \text{Equation (6)}$$

This implies that, for a given state q, there is a single set of spectral vectors P(f|z, q) and a single set of weights P(z|q). If the weights did not change across time, the observation model would then collapse to a single spectral vector per state. In the N-HMM model disclosed above, however, the weights $P(z_t|q_t)$ are configured to change with time. This flexible observation model allows variations in the occurrences of a given state.

After performing EM iterations, contributions from each may be reconstructed, for example, as shown in operation 345 of FIG. 3. The reconstruction process may be useful in certain applications such as, for example, content-aware signal processing or the like. Specifically, a reconstruction of the contribution from state $q_t$ at time t may be as follows:

$$\begin{aligned} P_t(f_t, q_t \mid \overline{f}, \overline{v}) &= P_t(q_t \mid \overline{f}, \overline{v}) P_t(f_t \mid q_t, \overline{f}, \overline{v}) \quad \text{Equation (7)} \\ &= \gamma_t(q_t) P_t(f_t \mid q_t) \\ &= \gamma_t(q_t) \sum_{z_t} P_t(z_t \mid q_t) P(f_t \mid z_t, q_t) \end{aligned}$$

Equation (7) provides the contribution of each dictionary or state with respect to other states at each time frame. In some embodiments, Equation (7) may be modulated by the original gain of the spectrogram. As such, the a reconstruction of the construction from state $q_t$ at time t may be given by:

$$P_t(f_t, q_t \mid \overline{f}, \overline{v}) \sum_f V_{ft}$$

Model Selection

In some embodiments, building an N-HMM model may involve a model selection process. Model selection may encompass a choice of model or user-defined parameters. In some embodiments, N-HMM model parameters may include a number of dictionaries and a number of spectral components per dictionary. These parameters may be user-defined. Additionally or alternatively, these parameters may be predetermined or automatically determined depending upon the application.

In some embodiments, Akaike information criterion (AIC), Bayesian information criterion (BIC), minimum description length (MDL), or any other suitable metric may be used for parameter evaluation. Further, metric(s) used for model optimization may be application-specific.

In various embodiments, a goal-seeking or optimization process may not always guarantee convergence to an absolute solution. For example, a goal-seeking process may exhaustively evaluate a solution space to ensure that the identified solution is the best available. Alternatively, the goal-seeking process may employ heuristic or probabilistic techniques that provide a bounded confidence interval or other measure of the quality of the solution. For example, a goal-seeking process may be designed to produce a solution that is within at least some percentage of an optimal solution, to produce a solution that has some bounded probability of being the optimal solution, or any suitable combination of these or other techniques.

N-HMM Modeling Examples

The following paragraphs illustrate N-HMM modeling for three non-limiting examples depicted in FIGS. 5A-E, FIGS. 6A-E, and FIGS. 7A-E, respectively. In each of these examples, the input is a spectrogram. It should be understood, however, that in other scenarios a time-domain signal may be received and processed to produce a time-frequency representation or spectrogram.

Figure 5A:
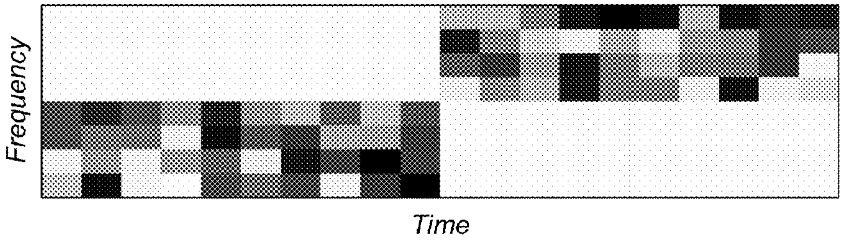
FIGS. 5A-E, 6A-E, and 7A-E are graphical representations of spectrograms and model parameters corresponding to a three N-HMM modeling examples according to some embodiments.

Referring to FIGS. 5A-E, graphical representations of a spectrogram and N-HMM model parameters corresponding to a first N-HMM modeling example are illustrated. Specifically, FIG. 5A shows a simulated spectrogram. In this particular example, the spectrogram was used as the input data to an algorithm or method similar to that depicted in FIG. 3. The illustrative histogram has eight frequencies and twenty time frames. It may be seen that the data in the first ten time frames are quite similar (energy only in the low frequencies), suggesting that it may be explained by a dictionary or state. Similarly, the data in the last ten time frames are quite similar (energy only in the high frequencies), suggesting that it may be explained by another dictionary.

Figure 5B:
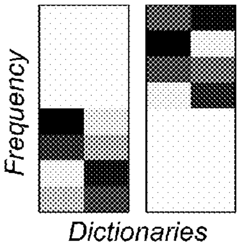

In FIG. 5B, graphical representations of two dictionaries are illustrated for the first N-HMM modeling example. Each dictionary has at least one spectral component, and in some cases two or more spectral components. These dictionaries were obtained using the techniques described above, and each models a different segment of the data. Specifically, the first dictionary may be used to model the first ten time frames of the spectrogram, and the second dictionary may be used to model the last ten time frames of the spectrogram. Each time frame of the spectrogram may be modeled as a linear combination of the spectral components in one of the dictionaries. In this particular example it should be noted that, when looking at the spectral components in a given dictionary, do not tend to have a high (or low) energy at the same frequency. Either one of the components has a high energy and the other component has a low energy at a given frequency, or both components have a moderate energy. In other words, the spectral components in a given dictionary explain different aspects of the spectrogram.

Figure 5C:
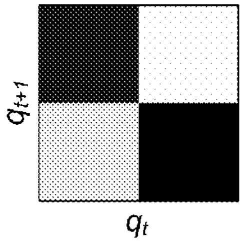

Referring now to FIG. 5C, a graphical representation of a transition matrix is depicted for the first N-HMM modeling example. As may be seen in the representation, the probability of remaining in a given state (state persistence) is high. This may be seen in the strong diagonal of the transition matrix. It may also be seen that at one of the time frames, there is a transition from state 1 to state 2. This corresponds to the small non-zero probability of $P(q_{t+1}=2|q_t=1)$ in the transition matrix. In fact, that probability is 0.1, which corresponds to there being a transition to state 2 in one out of the ten occurrences of state 1. Meanwhile, $P(q_{t+1}=1|q_t=2)=0$. This indicates that there is no transition from state 2 to state 1.

Figure 5D:
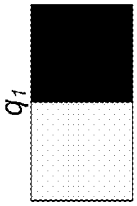
Figure 5E:
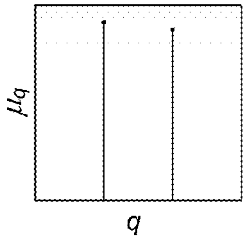

FIG. 5D shows initial state probabilities calculated for the first N-HMM modeling example. In this case, the data starts in state 1 with a probability of 1. FIG. 6E shows energy parameters for each dictionary. As confirmed by visual inspection, each of the energy states has a similar energy weight or level. The mean of the energy distribution that corresponds to each state, $\mu_q$, is therefore also similar.

Figure 6A:
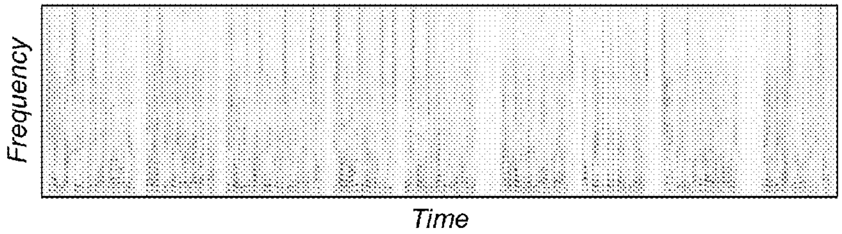
Figure 6B:
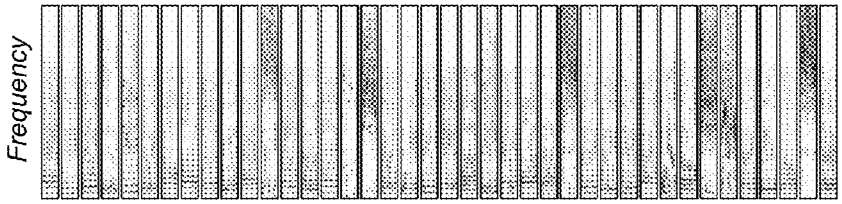
Figure 6C:
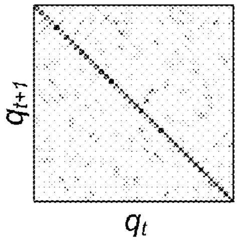
Figure 6D:
Figure 6E:
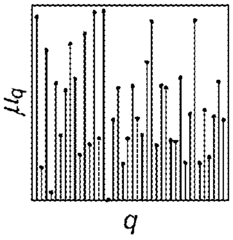

Referring to FIGS. 6A-E, graphical representations of a spectrogram and model parameters corresponding to a second N-HMM modeling example are illustrated. Particularly, FIG. 6A shows a simulated spectrogram that is the concatenation of nine sentences spoken by a human speaker as obtained from the publicly available TIMIT corpus (named after Texas Instruments (TI) and Massachusetts Institute of Technology (MIT)), which includes phonemically and lexically transcribed speech of American English speakers of different sexes and dialects. The spectrogram was computed using a short-time Fourier transform (STFT), with a window size of 64 ms and a hop size of 16 ms.

In FIG. 6B, graphical representations of 40 dictionaries are illustrated for the second N-HMM modeling example. Each dictionary has 10 spectral components. In this particular embodiment, each dictionary may correspond to a phoneme or a part of a phoneme. Some of the dictionaries may explain parts of voiced phonemes and some of the dictionaries may explain parts of unvoiced phonemes. A given dictionary may capture a fair amount of the variations within a given phoneme such as changes in pitch in a voiced phoneme. However, when there are large changes in pitch, different dictionaries may be used to explain the variations. If more dictionaries are used, more subtle variations within a phoneme may be explained by different dictionaries. On the other hand, if fewer dictionaries are used, more variations may be explained by a single dictionary, and a single dictionary may explain multiple phonemes.

Referring now to FIG. 6C, a graphical representation of a transition matrix is depicted for the second N-HMM modeling example. It should be noted that the matrix illustrates learned state persistence as indicated by the strong diagonal. In other words, in this particular embodiment, the transition matrix indicates that each given state tends to explain several adjacent time frames. The initial state probabilities of FIG. 6D indicate that the first time frame should be explained by dictionary or state 16. With respect to the energy distribution of FIG. 6E, it may be noted that the $\mu_q$ that corresponds to state 16 is almost 0. This indicates that the first frame of the input data has an energy of almost 0—i.e., silence (low energy noise).

Figure 7A:
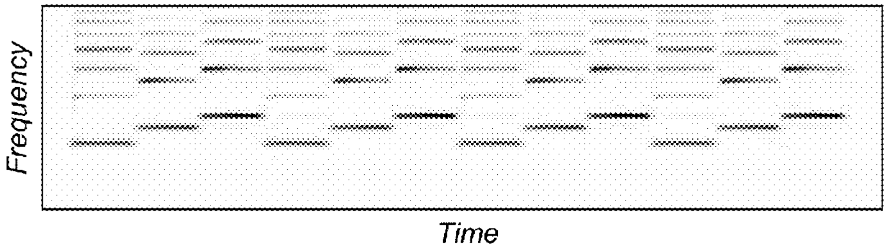

FIGS. 7A-E illustrate reconstructions from of the contributions from individual dictionaries for a third N-HMM modeling example according to some embodiments. FIG. 7A shows a spectrogram of a synthesized saxophone playing a C major arpeggio four times. Therefore, four repetitions of the sequence C-E-G may be identified. The spectrogram was computed using an STFT with a window size of 100 ms and a hop size of 25 ms (a constant-Q transform was used for displaying the fundamental frequencies of the different notes and the relation between the fundamental frequencies purposes).

Figure 7B:
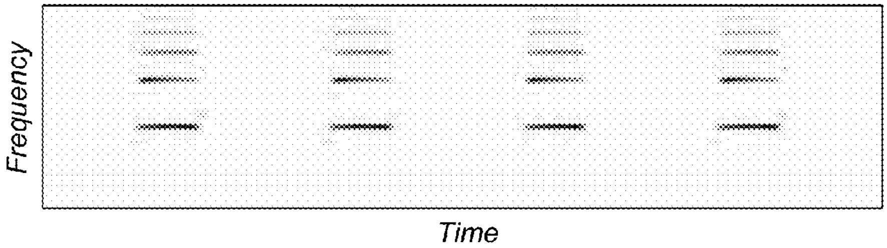
Figure 7C:
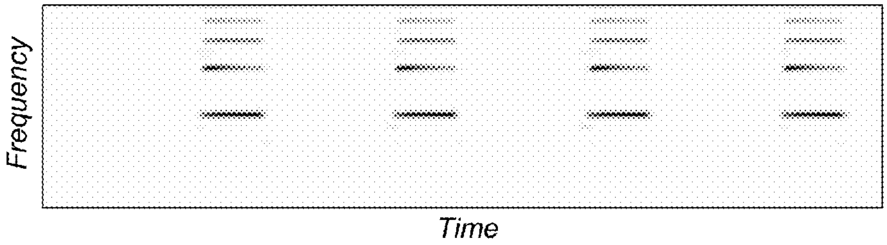
Figure 7D:
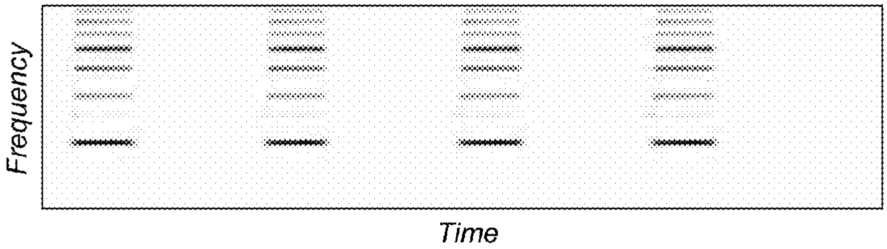

Because the data has 3 distinct notes, N-HMM parameter estimation was performed using 3 dictionaries. Each dictionary has 5 spectral components. Using the estimated parameters, the contributions from each of the three dictionaries may be reconstructed using Equation (7). These reconstructions are shown in FIGS. 7B-D for each respective dictionary corresponding to each single note. In some embodiments, audio signals may be obtained by using the phase of the original STFT to transform each reconstruction back to the time domain.

Figure 7E:
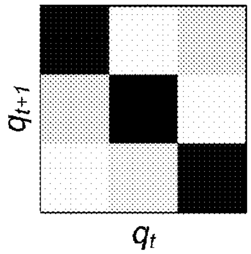

FIG. 7E shows a transition matrix for the third N-HMM modeling example. As seen in other examples, the strong diagonal corresponds to state persistence. Also, gray squares indicate a small probability of transiting to another note, and white squares indicate zero probability of transitioning.

Example Audio Applications

This section of the specification presents two illustrative applications of N-HMM models related to content-aware audio processing. In some embodiments, the methods described herein may be used in a wide array of applications, from making subtle volume changes to a particular aspect of a recording to completely changing the musical structure of the recording.

Figure 8:
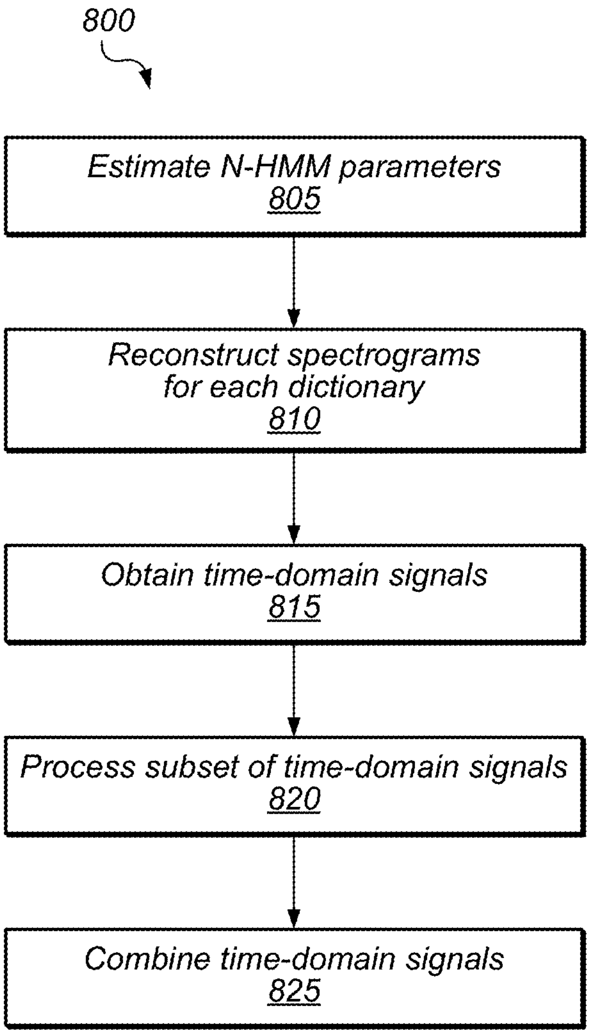
FIG. 8 is a flowchart of a method for content-aware audio processing based on N-HMM models according to some embodiments.

Referring to FIG. 8, a flowchart of method 800 for content-aware audio processing based on N-HMM models is depicted according to some embodiments. At 805, method 800 may estimate N-HMM parameters of a given spectrogram. At 810, method 800 may reconstruct spectrograms that correspond to contributions of each dictionary of the N-HMM model. At 815, method 800 may use the reconstructed spectrograms to obtain a time-domain signal that corresponds to each dictionary, for example, using inverse STFTs. In some embodiments, for example, operation 815 may also use the phase of the original STFT. At 820, method 800 may process one or more of the time-domain signals. And at 825, method 800 may sum, combine, mix, or "flatten" some or all of the time domain signals, including processed and/or unprocessed components or signals.

Again, the phase of the original STFT may be used to obtain the time domain signals that correspond to each of the individual dictionaries at operation 815. In some embodiments, each time frame of the spectrogram may be explained almost exclusively by a single dictionary. In that case, in the reconstructed spectrograms (corresponding to individual dictionaries), each time frame either corresponds almost exactly to the original spectrogram or has a magnitude of almost zero. Therefore, portions of a given reconstructed spectrogram that correspond to the original spectrogram may correspond to the phase of the original STFT. The other portions will not correspond to the phase of the original STFT but will have a magnitude of almost zero, and at least in some instances may be ignored. Accordingly, the phase of the original STFT may be used to obtain the time domain signals from the reconstructed spectrograms.

Mixed Sources

In some embodiments, signal analysis module 200 of FIG. 2 may implement a mixed signal model such as described in this section. In the paragraphs that follow, a non-negative factorial hidden Markov model (N-FHMM) is disclosed. In some embodiments, the N-FHMM model may be suitable for modeling sound mixtures. This model may be employed, for example, to perform source separation or the like.

An N-FHMM Model

In some embodiments, an N-FHMM may model each column of a time-frequency representation or spectrogram as a linear combination of spectral components of a dictionary. For example, in illustrative N-FHMM models, each source may have multiple dictionaries, and each dictionary of a given source may correspond to a state of that source. In a given time frame, each source may be in a particular state. Therefore, each source may be modeled by a single dictionary in that time frame. The sound mixture may then be modeled by a dictionary that is the concatenation of the active dictionaries of the individual sources.

Figure 9:
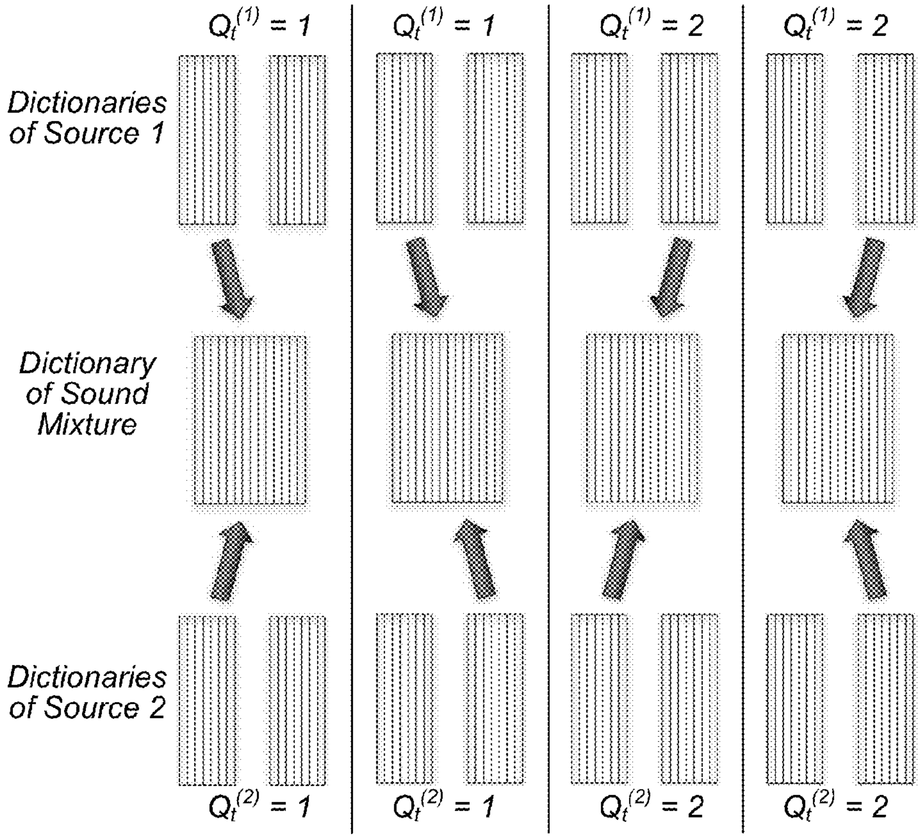
FIG. 9 is a diagram of different combinations of dictionaries that may be used to model a time frame using a non-negative factorial hidden Markov model (N-FHMM) according to some embodiments.

Referring to FIG. 9, a diagram of different combinations of dictionaries that may be used to model a time frame using the N-FHMM is depicted according to some embodiments. As illustrated, each source has two dictionaries. Generally, if each source has N states, the sound mixture may be explained with any one of the $N^2$ possible combinations of dictionaries in that time frame.

Figure 10:
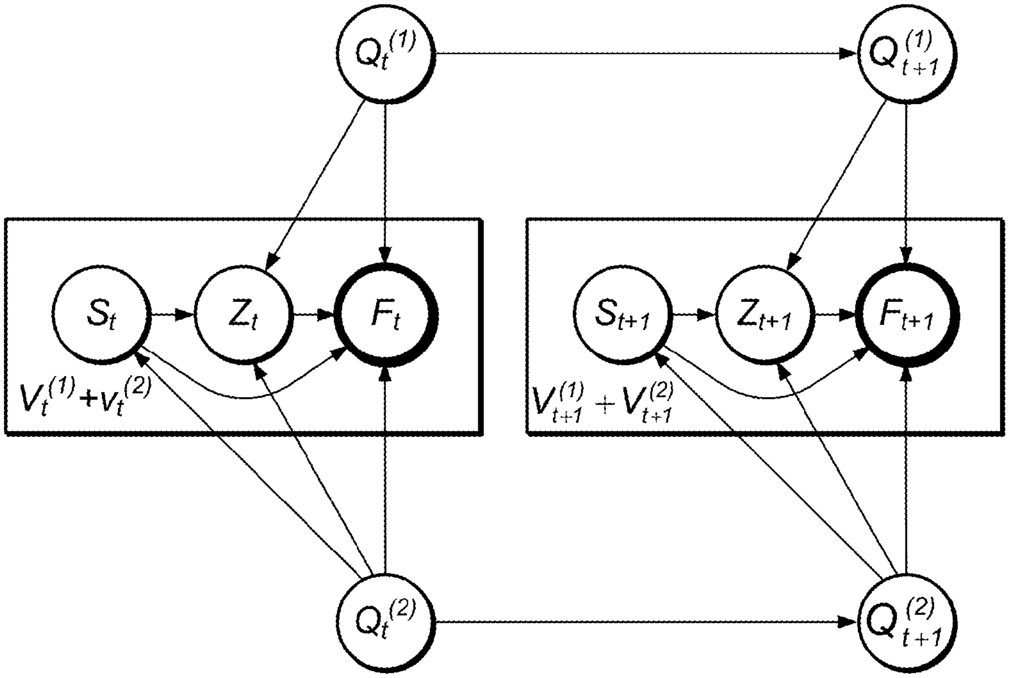
FIG. 10 is a graphical representation of an N-FHMM model for two or more sources according to some embodiments.

With reference to FIG. 10, a graphical representation of an N-FHMM model for two sources is depicted according to some embodiments. In some embodiments, an N-FHMM model combines multiple N-HMMs of single sources. The interaction model introduces a new variable $s_t$ that indicates the source. In the generative process, for each draw of each time frame, a source may be selected and then the latent component may be chosen. Here, as in FIG. 4, $F_t$ and $F_{t+1}$ represent observed random variables, and other nodes represent hidden random variables.

In a given time frame t, each source may be modeled or explained by one of its dictionaries. Therefore, a given mixture of two sources, for example, may be modeled by a pair of dictionaries, $\{q_t^{(1)}, q_t^{(2)}\}$, one from each source (superscripts indicate the source). For a given pair of dictionaries, a mixture spectrum may be defined by the following interaction model:

$$P(f_t \mid q_t^{(1)}, q_t^{(2)}) = \sum_{s_t} \sum_{z_t} P\left(f_t \mid z_t, s_t, q_t^{(s_t)}\right) P(z_t, s_t \mid q_t^{(1)}, q_t^{(2)}) \quad \text{Equation (10)}$$

In other words, in some embodiments, the mixture spectrum may be modeled as a linear combination of individual sources, which in turn may each be modeled as a linear combination of spectral vectors from their respective dictionaries. This allows modeling the mixture as a linear combination of the spectral vectors from the given pair of dictionaries.

Figure 11:
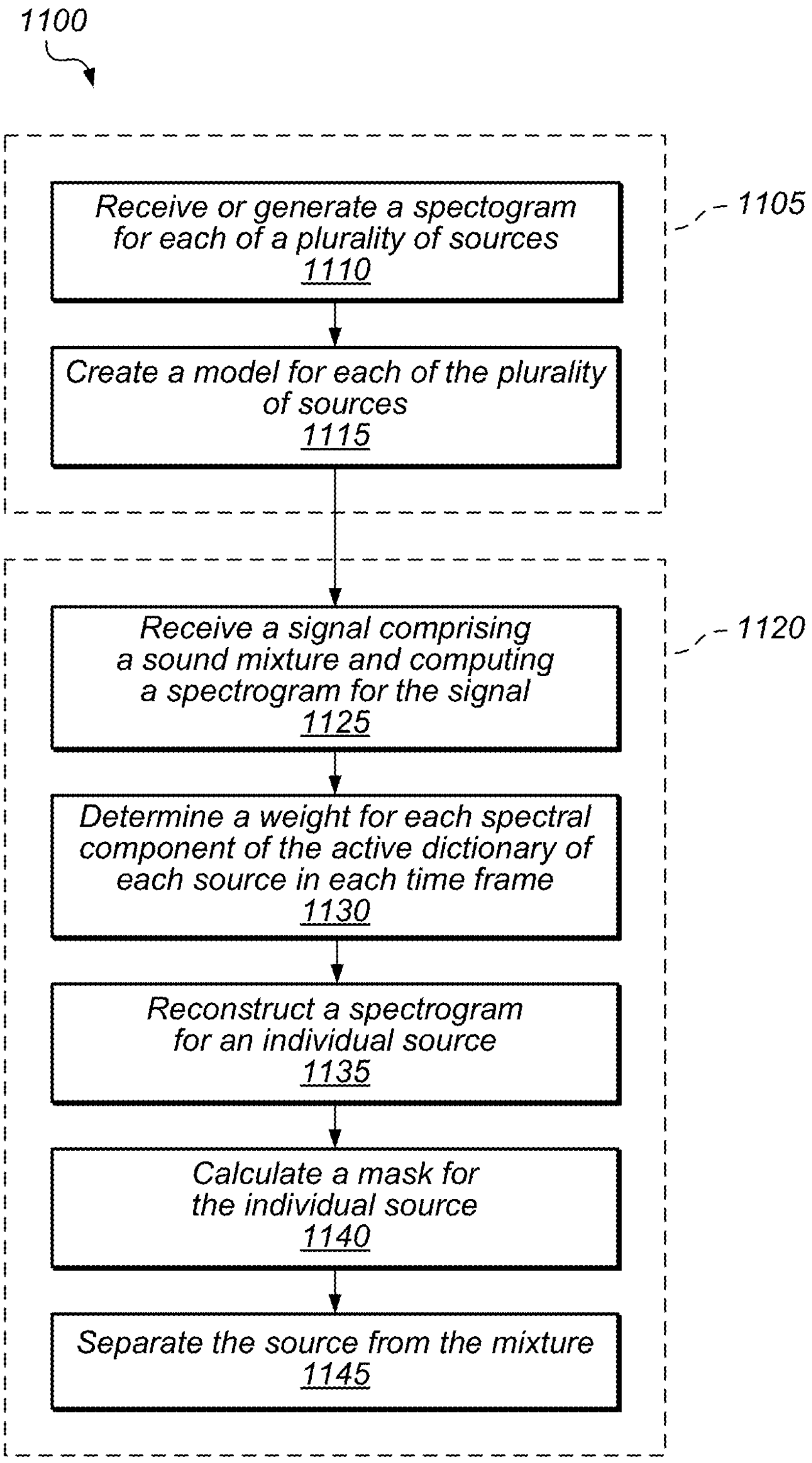
FIG. 11 is a flowchart of a method for a non-negative factorial hidden Markov model (N-FHMM) for mixed sources according to some embodiments.

Referring now to FIG. 11, method 1100 for a non-negative factorial hidden Markov model (N-FHMM) for mixed sources is depicted according to some embodiments. For example, method 1100 may be performed, at least in part, by signal analysis module 200 of FIG. 2. Similarly to method 300 of FIG. 3, method 1100 may be split into two stages: training stage 1105 and application stage 1120. Although method 1100 is illustrated showing application stage 1120 immediately following training stage 1105, it should be noted that these stages may be independently performed at different times and by different entities. In some implementations, training stage 1105 may take place "offline" based on training data, and application stage 1120 may be executed "online" based on data desired to be processed. In other implementations, both training stage 1105 and application stage 1120 may be executed online.

At 1110 of training phase 1105, method 1100 may receive or otherwise calculate a time-frequency representation or histogram for each of a plurality of sources. In some embodiments, each spectrogram may be calculated based on a time-varying signal, and the signal may be a previously recorded training signal or other a priori source information. Additionally or alternatively, each signal may be a portion of a live signal being received at signal analysis module 200.

At 1115, method 1100 may create N-HMM models for each of the plurality of sources. In some embodiments, a given model for a given source may include several dictionaries that explain an entire spectrogram such that a given time frame of the spectrogram may be explained mainly by a single dictionary. In these cases, multiple segments in different parts of the spectrogram may be explained by the same dictionary. Additionally or alternatively, each model may include a dictionary for each time frame of its corresponding source's spectrogram, where each dictionary includes at least one spectral component, and in some cases two or more spectral components. Each N-HMM model may also include a transition matrix containing the probabilities of transition between dictionaries. In some embodiments, operation 1115 may involve operations similar to those of training phase 305 of N-HMM method 300 for each source.

At 1125 of application phase 1120, method 1100 may receive a time-varying signal comprising a sound mixture generated by one or more of the previously modeled sources. Additionally or alternatively, operation 1125 may compute a spectrogram of a received time-varying signal. Then, at 1130, method 1100 may determine a weight for one or more of the sources based, at least in part, on the spectrogram. For example, method 1100 may calculate or estimate weights for each spectral component of the active dictionary of each source in each segment or time frame of the spectrogram. The "active dictionary" may be, for example, a dictionary that adequately and/or better explains a given source's behavior in a given segment. At 1135, method 1100 may reconstruct spectrograms corresponding to contributions of each dictionary for each selected source based on the model(s) and the estimated weight(s). And at operation 1140 method 1100 may calculate a mask for one or more of the sources based on the reconstruction operation.

For example, to perform source separation at operation 1145, the mask may be applied to the mixture to isolate contributions from its corresponding source. In some embodiments, $P(z_t, s_t|q_t^{(1)}, q_t^{(2)})$ may be used rather than dealing with $P(z_t|s_t, q_t^{(1)}, q_t^{(2)})$ and $P(s_t|q_t^{(1)}, q_t^{(2)})$ individually (as may be seen in the graphical model of FIG. 13) so that there is a single set of mixture weights over both sources. These operations are discussed in more detail below.

Source Separation

As mentioned above in connection with FIG. 11, in some embodiments, to perform separation, mixture weights $P(z_t, s_t|q_t^{(1)}, q_t^{(2)})$ may be estimated for each pair of states or dictionaries. Although only two sources are used in the equations that follow, it should be understood that this technique is similarly applicable to three or more sources. Further, weight estimation may be performed by any suitable method such as, for example, an EM method. In that case, the E operation may be computed as follows:

$$P(z_t, s_t, q_t^{(1)}, q_t^{(2)} \mid f_t, \bar{f}) = \frac{\alpha(q_t^{(1)}, q_t^{(2)})\beta(q_t^{(1)}, q_t^{(2)})}{\sum_{q_t^{(1)}}\sum_{q_t^{(2)}} \alpha(q_t^{(1)}, q_t^{(2)})\beta(q_t^{(1)}, q_t^{(2)})} P(z_t, s_t \mid f_t, q_t^{(1)}, q_t^{(2)}) \quad \text{Equation (11)}$$

where:

$$P(z_t, s_t \mid f_t, q_t^{(1)}, q_t^{(2)}) = \frac{P(f \mid z_t, s_t, q_t^{(s_t)})P(z_t, s_t \mid q_t^{(1)}, q_t^{(2)})}{\sum_{s_t}\sum_{z_t} P(f \mid z_t, s_t, q_t^{(s_t)})P(z_t, s_t \mid q_t^{(1)}, q_t^{(2)})} \quad \text{Equation (12)}$$

$\alpha(q_t^{(1)}, q_t^{(2)})$ and $\beta(q_t^{(1)}, q_t^{(2)})$ may be computed, for example, with a two-dimensional forward-backward algorithm using the likelihoods of the data $P(f_t|q_t^{(1)}, q_t^{(2)})$ for each pair of states. These likelihoods may be computed as follows:

$$P(f_t \mid q_t^{(1)}, q_t^{(2)}) = \prod_{f_t}\left(\sum_{s_t}\sum_{z_t} P(f_t \mid z_t, s_t, q_t^{(s_t)})P(z_t, s_t \mid q_t^{(1)}, q_t^{(2)})\right)^{\gamma V_{ft}} \quad \text{Equation (13)}$$

Accordingly, the weights may be computed in the M operation as follows:

$$P(z_t, s_t \mid q_t^{(1)}, q_t^{(2)}) = \frac{\sum_{f_t} V_{ft} P(z_t, s_t, q_t^{(1)}, q_t^{(2)} \mid f_t, \bar{f})}{\sum_{s_t}\sum_{z_t}\sum_{f_t} V_{ft} P(z_t, s_t, q_t^{(1)}, q_t^{(2)} \mid f_t, \bar{f})} \quad \text{Equation (14)}$$

Once the weights are estimated using the EM algorithm, a proportion of the contribution of each source at each time-frequency bin may be computed as follows:

$$P(s_t \mid f_t) = \frac{\sum_{q_t^{(1)}}\sum_{q_t^{(2)}} P(q_t^{(1)}, q_t^{(2)} \mid \bar{f}) \sum_{z_t} P(f \mid z_t, s, q_t^{(s)})P(z_t, s \mid q_t^{(1)}, q_t^{(2)})}{\sum_{s_t}\sum_{q_t^{(1)}}\sum_{q_t^{(2)}} P(q_t^{(1)}, q_t^{(2)} \mid \bar{f}) \sum_{z_t} P(f \mid z_t, s, q_t^{(s)})P(z_t, s \mid q_t^{(1)}, q_t^{(2)})} \quad \text{Equation (15)}$$

where:

$$P(q_t^{(1)}, q_t^{(2)} \mid \bar{f}) = \frac{\alpha(q_t^{(1)}, q_t^{(2)})\beta(q_t^{(1)}, q_t^{(2)})}{\sum_{q_t^{(1)}}\sum_{q_t^{(2)}} \alpha(q_t^{(1)}, q_t^{(2)})\beta(q_t^{(1)}, q_t^{(2)})} \quad \text{Equation (16)}$$

In some embodiments, Equation 15 may provide a soft mask that may be used to modulate the mixture spectrogram to obtain separated spectrograms of individual sources.

In Equation 15, the contributions of every pair of states are combined. This implies that the reconstruction of each source has contributions from each of its dictionaries. In some embodiments, however, $P(q_t^{(1)}, q_t^{(2)}|\bar{f})$ tends to zero for all but one $\{q_t^{(1)}, q_t^{(2)}\}$ pair, effectively using only one dictionary per time frame per source. This may be the case when the dictionaries of individual source models are learned in such a way that each time frame is explained almost exclusively by one dictionary. In some embodiments, the provision of having a small non-zero contribution from more than one dictionary may be helpful in modeling the decay of the active dictionary in the previous time frame.

Experiments

The source separation techniques described above were tested in speech separation experiments based on data from the TIMIT database. Specifically, separation was performed on eight pairs of speakers. Each speaker pair included one male and one female speaker. First, nine sentences of each speaker were used as training data, individual N-HMM model parameters for each speaker were learned.

Specifically, for each speaker, a spectrogram with a window size of 1024 and a hop size of 256 (at Fs=16,000) was obtained. An N-HMM model of each spectrogram was created using 40 dictionaries with 10 latent components each (K=10). The experiments were then repeated with 1 latent component per dictionary (K=1). After training, the models were combined the models into a joint model. Test data was obtained by artificially mixing one unseen sentence from each speaker at 0 dB and performing separation. The separation yielded estimated magnitude spectrograms for each source. The phase of the mixture was then used to re-synthesize or reconstruct each source.

For sake of comparison, the same experiments were then performed using a non-negative factorization approach ("Factorization"). The experimental procedure as well as the training and test data were the same. After testing, it was found that optimal results were obtained in the non-negative factorization approach by using 30 components per speaker. Separation performance is shown in Table I below for averaged results over the eight pairs of speakers:

TABLE I

| | SDR (dB) | SIR (dB) | SAR (dB) |
|---|---|---|---|
| N-FHMM (K = 10) | 6.49 | 14.07 | 7.74 |
| N-FHMM (K = 1) | 5.58 | 12.07 | 7.26 |
| Factorization | 4.82 | 8.65 | 7.95 |

In Table I, signal-to-interference ratio (SIR) is a measure of the suppression of an unwanted source, signal-to-artifact ratio (SAR) is a measure of artifacts (such as, for example, musical noise) that may be introduced by the separation process, and signal-to-distortion ratio (SDR) is an overall measure of performance that accounts for both SDR and SIR.

As may be noted from Table I, performance of the N-FHMM model was better when using 10 components per dictionary (i.e., K=10) rather than only 1 component (i.e., K=1). This shows that, in general, there are appreciable benefits in using multiple spectral components per dictionary to model each state rather than a single component.

In some applications, there may be a given number of components per dictionary (e.g., 10) above which improvement is not as easily noticed. Even in those cases, however, results of source separation experiments show various benefits of N-FHMM over factorizations in the overall performance in terms of SDR. For example, there is a large improvement in the actual suppression of the unwanted source (SIR), etc.

Model Selection

In some embodiments, building an N-FHMM model may involve a model selection process. Model selection may involve a choice of model configurations or user-defined parameters. Similarly to an N-HMM model, N-FHMM model parameters may include the number of dictionaries and the number of spectral components per dictionary.

Figure 12:
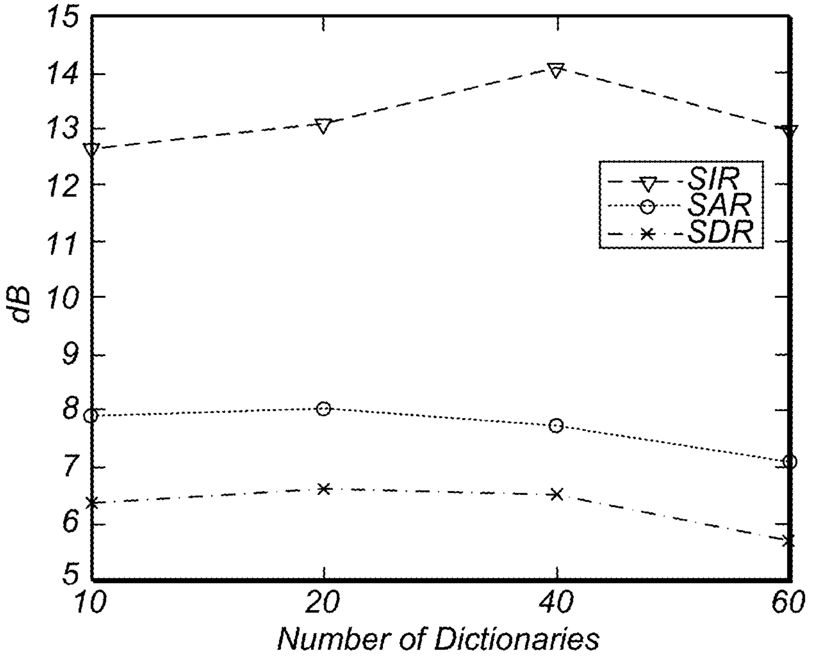
FIG. 12 shows a graph illustrating N-FHMM model performance for up to 60 dictionaries according to various metrics according to some embodiments.

In some embodiments, the number of dictionaries may depend upon a specific type of application, environment, or model. For example, FIG. 12 shows a graph illustrating model performance for up to 60 dictionaries according to various metrics. The model used in this particular embodiment was the same one used in the Experiments section above. To generate this graph, the number of spectral components of each dictionary was fixed at 10. It may be noted that, if a given application is more sensitive to SIR metric, then 40 dictionaries may yield better results. On the other hand, if SAR is the metric of interest, then 20 dictionaries may be preferred.

Figure 13:
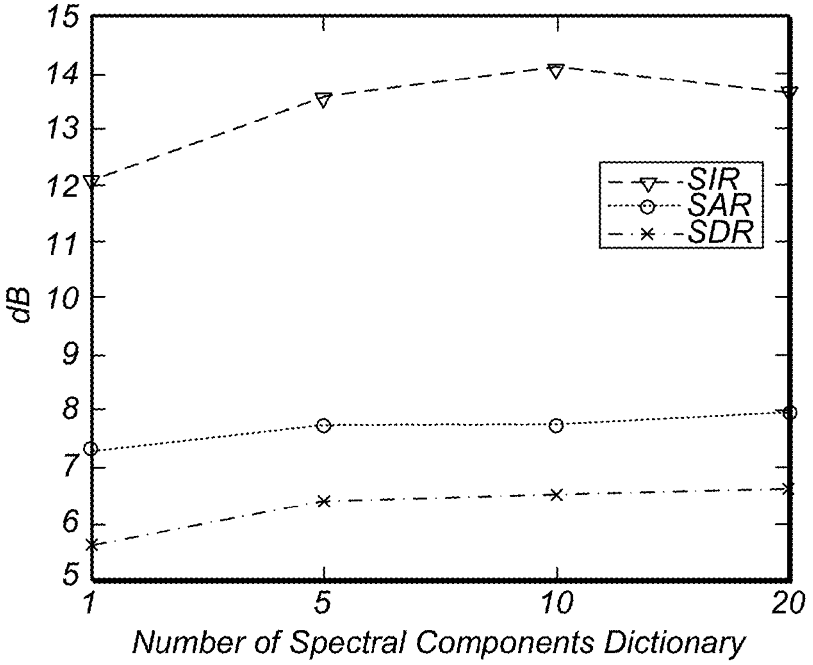
FIG. 13 shows a graph illustrating N-FHMM model performance for up to 20 spectral components per dictionary according to various metrics.

FIG. 13 shows a graph illustrating model performance for up to 20 spectral components per dictionary according to various metrics. Again, the model used in this particular embodiment was the same one used in the Experiments section above. To generate this graph, the number of dictionaries was fixed at 40. It may be noted that, if a given application is more sensitive to SIR metric, then 10 spectral components per dictionaries may be preferable. Meanwhile, if SDR is the metric of interest, for example, then 20 spectral components per dictionaries may be used.

Semi-Supervised Source Separation

In some embodiments, signal analysis module 200 of FIG. 2 may implement semi-supervised source separation using non-negative techniques. Generally speaking, these techniques may include receiving a mixed signal containing a combination of a signal of interest with other signals, and separating the signal of interest or selected signal from these other signals. For ease of explanation, the examples illustrated below refer to a particular scenario where the "signal of interest" includes human speech, and the "other signals" include noise (e.g., background noise or the like). Although the term "noise" is used to distinguish the "other signals" from speech, it is understood that, in some cases, "noise" may also include other speech signals that might interfere with the speech signal that is included in the signal of interest. Additionally, in other embodiments, the "signal of interest" may include other types of signals such as, for example, music or the like.

In certain embodiments, an N-HMM source model may be used to model a speech component (or some other component of interest) within a mixed signal. For example, such an N-HMM source model may use a plurality of non-negative spectral dictionaries and a Markov chain, similarly as described above. The mixture signal may contain a mixture of speech and noise components, and may be modeled using a non-negative factorial hidden Markov model (N-FHMM), also similarly as described above. In contrast with previously discussed techniques, however, here the source separation may be performed in a semi-supervised manner. Particularly, the source model for the speech component of the mixed signal may be learned from speech training data, whereas a model of the noise component of the mixed signal may be learned during performance of the source separation procedure and in the absence of corresponding training data (i.e., "on-the-fly").

Figure 14:
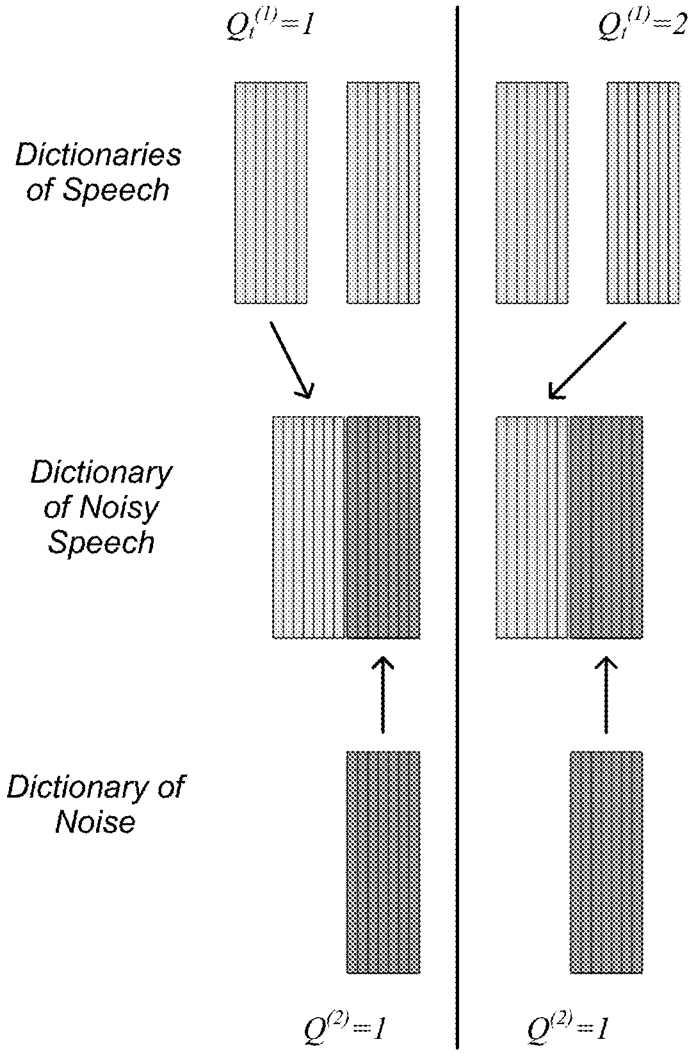
FIG. 14 shows a plurality of dictionaries used in a source model, a single dictionary used in a noise model, and their possible combinations according to some embodiments.

In some embodiments, each component of the mixed signal may be modeled in the spectrogram domain. Turning to FIG. 14, a diagram showing a plurality of dictionaries used in a source model, a single dictionary used in a noise model, and their possible combinations are depicted according to some embodiments. Specifically, the noise portion of the mixed signal may be modeled using a single spectral dictionary, whereas the source portion (e.g., speech) may be modeled using a plurality of spectral dictionaries of an N-HMM model. Although only two spectral dictionaries are shown in the N-HMM model of FIG. 14, a larger number of dictionaries may be used in other cases.

As noted in previous sections, the use of multiple dictionaries allows an N-HMM to model the non-stationarity that is characteristic of certain signals (e.g., speech signals) such that, in a given time frame of a spectrogram, the signal may be modeled by a linear combination of the spectral components from one (of the many) spectral dictionaries. Moreover, the noise portion (in any time frame of the spectrogram) may be modeled by a linear combination of the spectral components from a single dictionary. Accordingly, a given time frame of the noisy speech (mixture) may be modeled as a linear combination of spectral components from a concatenation of one of the various dictionaries of the speech model with the single dictionary of the noise model.

Figure 15:
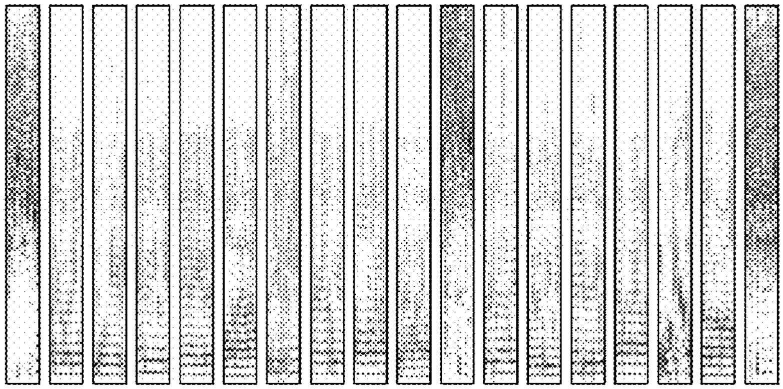
FIG. 15 shows dictionaries of spectral components of a speech signal according to some embodiments.

FIG. 15 shows dictionaries of spectral components of a speech signal according to some embodiments. Eighteen (of a total of forty) spectral dictionaries were learned from a speech sample or training signal are depicted. As illustrated, each of the eighteen spectral dictionaries includes ten spectral components and corresponds approximately to a sub-unit of speech (e.g., a phoneme or a portion of a phoneme). In cases where the signal of interest includes music, each spectral component may include a sub-unit of music (e.g., a musical note or a portion thereof).

The graphical representation of an N-HMM model for a speech signal is the same as previously shown in FIG. 4. Again, each dictionary may correspond to a state q. At time t, the N-HMM is in state $q_t$. Each spectral component of a given dictionary q may be represented by z. In some embodiments, a given spectral component may be a multinomial distribution. Therefore, spectral component z of dictionary q may be represented by P(f|z, q). Because each column of the spectrogram of speech is modeled as a linear combination of spectral components, time frame t (modeled by state q) may be given by Equation (6) above. Moreover, transitions between states may be modeled with a Markov chain given by $P(q_{t+1}|q_t)$.

Figure 16:
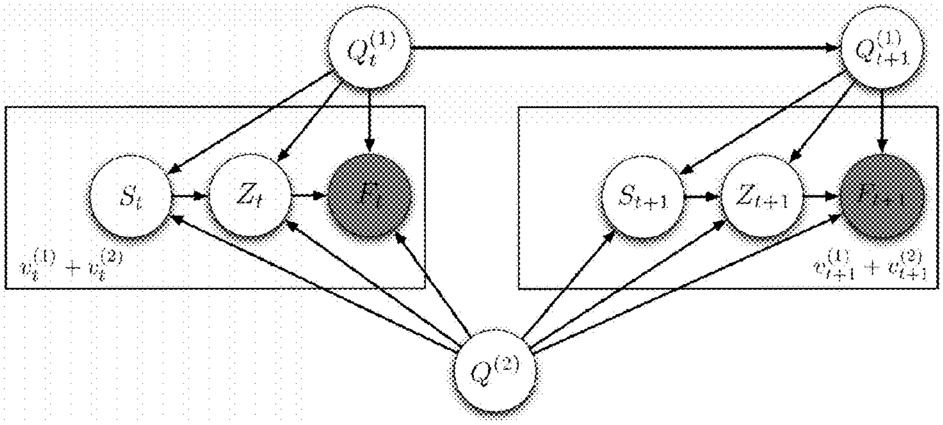
FIG. 16 shows a graphical representation of an N-FHMM model for semi-supervised source separation according to some embodiments.

Using the semi-supervised source separation techniques described in this section, the mixture signal may be modeled using the graphical representation shown in FIG. 16. The diagram of FIG. 16 is similar to FIG. 10, in that a representation of the N-HMM model for speech is found in the upper half of the representation. In contrast with FIG. 10, however, a degenerate N-HMM (single state for all frames) of noise may be found in the lower half of the figure. A given time frame is modeled by a pair of dictionaries $\{q_t^{(1)}, q^{(2)}\}$, one of each source. The subscript in $q_t^{(1)}$ indicates that more than one spectral dictionary may be used to model the speech signal (i.e., $q_t^{(1)}$ is a function of time), and the lack of such a subscript in $q^{(2)}$ indicates that a single spectral dictionary may be used to model the noise signal (i.e., $q^{(2)}$ is not a function of time). Similarly as before, the interaction model of two (or more) sources introduces variable $s_t$ that indicates the ratio of the sources at a given time frame, and $P(s_t|q_t^{(1)}, q^{(2)})$ is a Bernoulli distribution that depends on the states of the sources at the given time frame.

Hence, in this case, the interaction model may be given by:

$$P(f_t \mid q_t^{(1)}, q_t^{(2)}) = \sum_{s_t} \sum_{z_t} P(f_t \mid z_t, s_t, q_t^{(s_t)}) P(z_t, s_t \mid q_t^{(1)}, q_t^{(2)}) \quad \text{Equation (17)}$$

where $P(f_t|z_t, s_t, q_t^{(st)})$ is a spectral component $z_t$ of state $q_t^{(st)}$ of source $s_t$. Because $q^{(2)}$ is a single spectral dictionary, there is only one state for the noise signal. Further, $P(z_t, s_t|q_t^{(1)}, q^{(2)})$ provides mixture weights for spectral components of state $q_t^{(1)}$ of source $q^{(2)}$.

Figure 17:
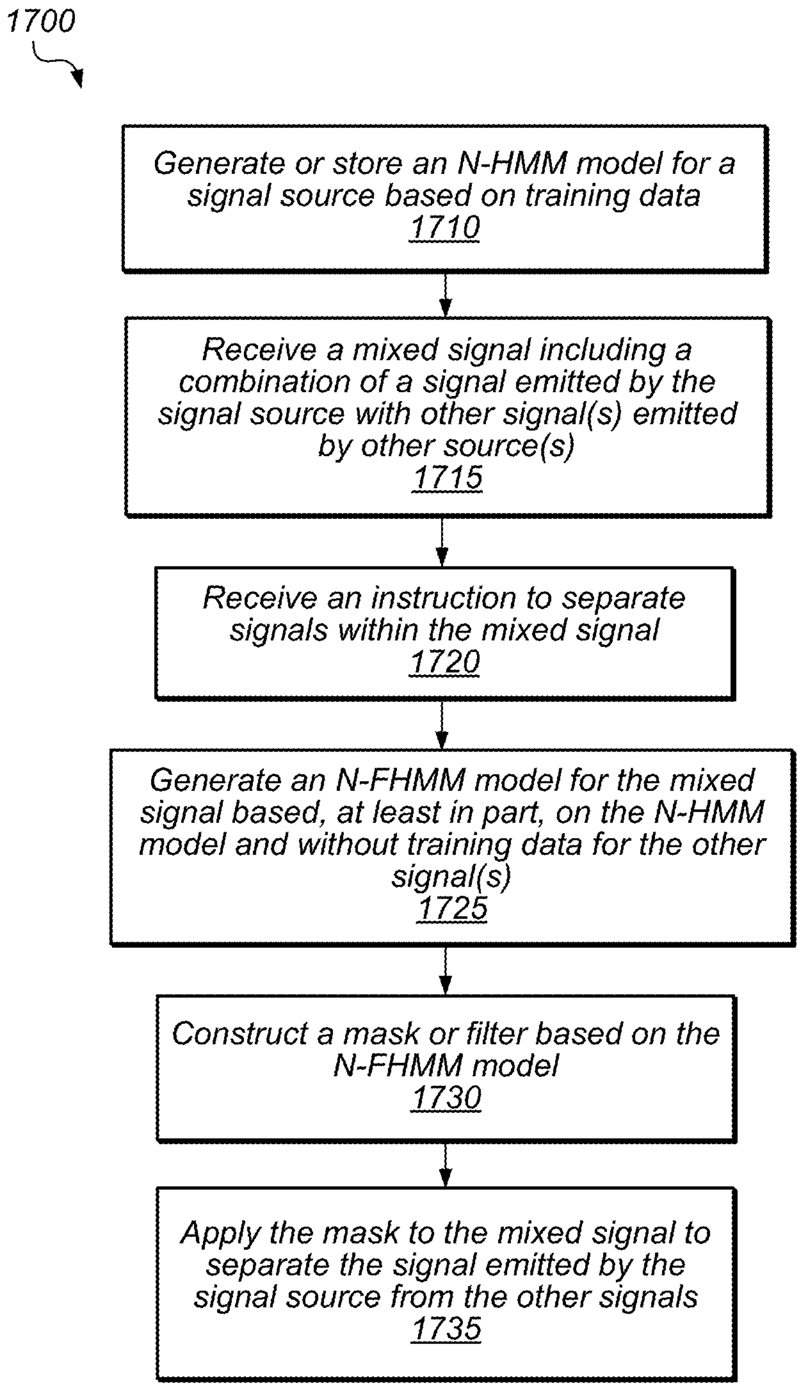
FIG. 17 shows a flowchart of a method for semi-supervised source separation according to some embodiments.

Turning now to FIG. 17, a flowchart of a method for semi-supervised source separation is depicted according to some embodiments. At block 1710, method 1700 may generate or store an N-HMM model for a signal source based on training data. For example, parameters of the N-HMM model (e.g., a polynomial distribution) may be learned from a clean speech sample (i.e., a training signal) in spectrogram form using the Expectation-Maximization ("EM") algorithm. In some embodiments, the N-HMM model may include a plurality of spectral dictionaries corresponding to the training signal such that a given segment of the training signal may be represented by a given one of the plurality of spectral dictionaries. Also, each of the plurality of spectral dictionaries may include at least one spectral component, and in some cases two or more spectral components. The N-HMM model may further include probabilities of transition among the plurality of spectral dictionaries.

At block 1715, method 1700 may receive a mixed signal including a combination of a signal emitted by the signal source with other signal(s) emitted by other source(s). For example, the mixed signal may include speech and the other signal(s) may include noise. At block 1725, in response to receiving an instruction to separate the speech signal from the noise signal in block 1720, method 1700 may include generating a mixture model for the mixed signal using, at least in part, the N-HMM speech model. In some embodiments, the mixture model may be generated as an N-FHMM model. As such, the mixture model may include a plurality of mixture weights corresponding to the combination of speech and noise signals, and a spectral dictionary corresponding to the noise signal. Furthermore, in some embodiments, the operations of block 1725 may be performed without training data corresponding to the noise signal.

At block 1730, method 1700 may construct a mask or filter based, at least in part, on the parameters of the N-FHMM model. And, at block 1735, method 1700 may apply the mask or filter to the mixed signal to separate the signal emitted by the signal source (e.g., speech) from the other signals (e.g., noise).

Figure 18A:
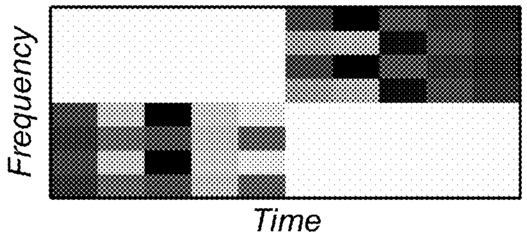
FIGS. 18A-D show spectrograms illustrating a de-noising experiment according to some embodiments.
Figure 18B:
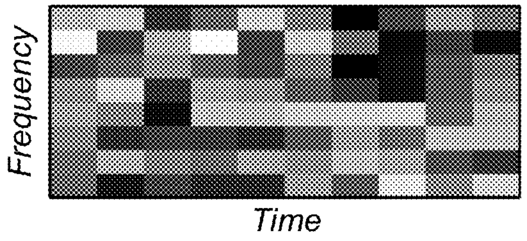
Figure 18C:
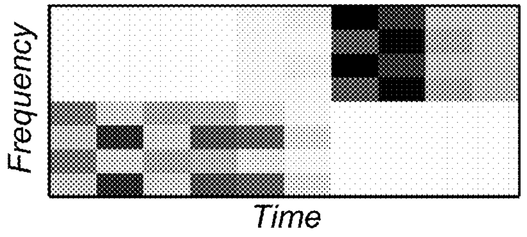

FIGS. 18A-D show spectrograms illustrating a music de-noising experiment according to some embodiments. In this example, FIG. 18A shows an original, clean musical signal in spectrogram form comprising a low frequency portion followed by a high frequency portion. FIG. 18B shows a mixed signal that includes the original signal with added noise; that is, an instance of a mixed signal. FIG. 18C shows results of a de-noising operation using the semi-supervised signal separation techniques described above, whereas FIG. 18D shows corresponding results using a nonnegative spectrogram factorization technique.

Figure 18D:
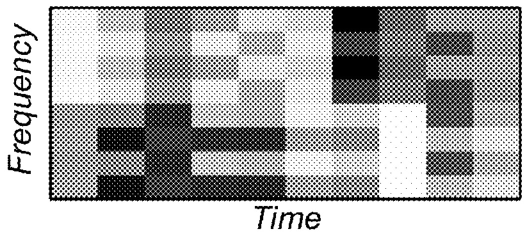

In this de-noising experiment, two dictionaries of two spectral components each were used to model the clean signal of FIG. 18A (a first spectral dictionary corresponding to the low frequency portion and a second spectral dictionary corresponding the high frequency portion). For sake of comparison, the non-negative spectrogram factorization technique was performed using four spectral components. Therefore, both the semi-supervised signal separation and the factorization techniques used the same number of spectral components to model the same original signal. In both cases, the added noise shown in the mixed signal of FIG. 18B was random. It may be noted that FIG. 18C shows that the semi-supervised signal separation techniques yield significantly better results than non-negative spectrogram factorization methods results shown in FIG. 18D. Particularly, the separated spectrogram of FIG. 18C resembles the original signal more than the separated spectrogram of FIG. 18D. Conversely, the spectrogram of FIG. 18D is similar to the spectrogram of the mixed signal in FIG. 18B, thus indicating that the noise component of the mixed signal remains in the spectrogram obtained through the factorization technique to a greater extent than in the spectrogram of FIG. 18C obtained using semi-supervised source separation.

In another experiment, speech de-noising was performed using semi-supervised signal separation techniques. Specifically, samples from sixteen speakers (eight male and eight female) from the TIMIT database were obtained. For each speaker, the experiments involved using three different real world noises (ambient noise at an airport, traffic junction, and cafeteria noise). Therefore, a total of forty-eight experiments were performed for a given signal-to-noise ("SNR"). Training data was obtained by concatenating nine sentences of a given speaker, calculating a spectrogram, and learning N-HMM parameters, which resulted in 40 dictionaries of 10 spectral components each as well as a transition matrix. Non-negative spectrogram factorization techniques yielded one dictionary of 30 spectral components each (a decrease in separation performance was observed when more than 30 spectral components per source were used for non-negative spectrogram factorization). As such, one dictionary of 10 spectral components was used to model noise in both cases. Noisy speech was obtained by adding noise to an unseen sentence of the same speaker. Finally, the unspecified parameters of the N-FHMM were learned based on the specified parameters of the N-HMM model and clean speech was reconstructed. The same experiment was repeated at three different SNRs (3 dB, 0 dB, and −3 dB), and the results are provided in Table II below:

TABLE II

| | | 3 dB | 0 dB | −3 dB |
|---|---|---|---|---|
| SIR | Semi-Supervised | 17.24 | 12.95 | 6.66 |
| | Factorization | 12.26 | 6.46 | 0.61 |
| SAR | Semi-Supervised | 8.17 | 7.82 | 4.70 |
| | Factorization | 12.27 | 8.90 | 5.38 |
| SDR | Semi-Supervised | 7.41 | 6.22 | 1.49 |
| | Factorization | 8.81 | 3.83 | −1.89 |

Referring to Table II, actual suppression of noise is reflected in the source-to-interference ratio (SIR) entries. It may be noted that in some cases, with respect to SIR, the semi-supervised signal separation methods described herein may achieve superior results at all three SNR levels. Furthermore, the semi-supervised signal separation techniques perform better as the noise level increases (i.e., lower SNR). Artifacts that are introduced by the de-noising process are reflected in the source-to-artifacts ratio (SAR) entries. It may be noted that non-negative spectrogram factorization introduces less artifacts than the semi-supervised signal separation techniques. However, the difference is small for high noise levels (0 dB and −3 dB SNR). Lastly, overall performance is reflected in the source-to-distortion ratio (SDR). The semi-supervised signal separation techniques perform better at high noise levels due to the higher noise suppression and only a small increase in artifacts. At 3 dB SNR, however, non-negative spectrogram factorization performed better in this particular case due to a smaller difference in noise suppression and a larger difference in artifacts.

Figure 19A:
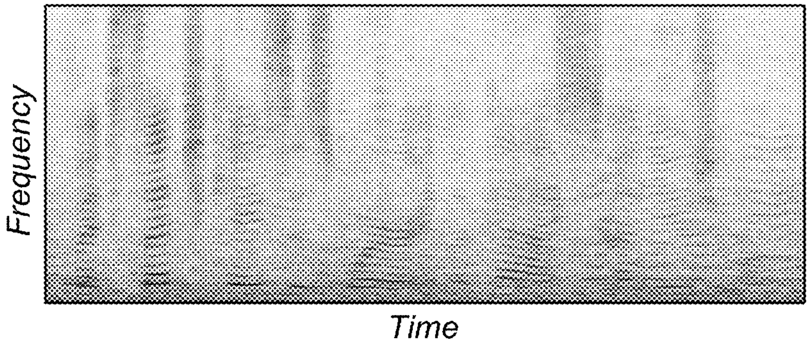
FIGS. 19A-C show an illustration of speech de-noising results using semi-supervised signal separation and non-negative spectrogram factorization according to some embodiments.
Figure 19B:
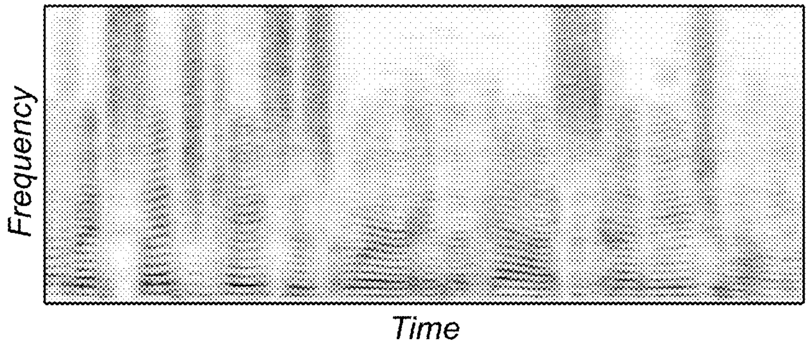
Figure 19C:
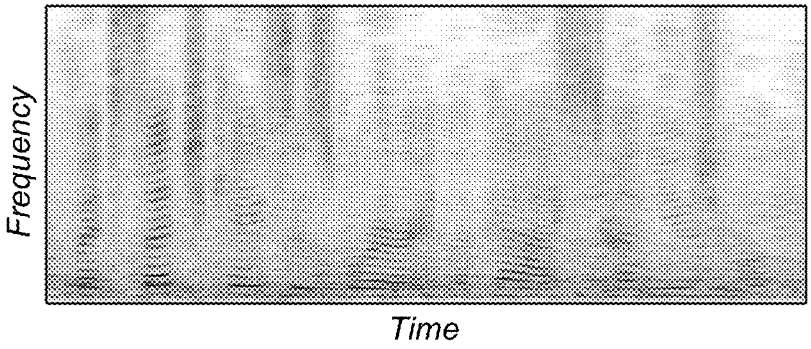

Turning now to FIGS. 19A-C, an illustration of speech de-noising results using semi-supervised signal separation and non-negative spectrogram factorization is depicted according to some embodiments. Particularly, FIG. 19A shows a spectrogram of a mixed signal or noisy speech. FIG. 19B shows a spectrogram of de-noised speech using semi-supervised signal separation techniques, and FIG. 19C shows a spectrogram of de-noised speech using non-negative spectrogram factorization. The noise signal present in the mixed signal of FIG. 19A is ambient noise in an airport.

Generally speaking, the increased noise suppression capability (SIR) using semi-supervised signal separation seen in FIG. 19B and in Table II may be attributed, at least in part, to its structured and constrained model. Particularly, each time frame of the speech component of the noisy speech (i.e., mixed signal) spectrogram may be explained by one (e.g., out of forty) spectral dictionary and each dictionary includes spectral components that correspond roughly to a specific sub-unit of speech (e.g., a phoneme or a portion thereof). Therefore, unless a given time frame corresponds to an unvoiced phoneme, the N-HMM speech model may tend to suppress the noise portion of the mixed signal. In contrast, non-negative spectrogram factorization uses a single dictionary to explain all of the voiced and unvoiced phonemes. Therefore, even if a time frame of the speech part of the mixed signal corresponds to a voiced phoneme, certain spectral components from the dictionary may be able to explain noise in that same time frame (i.e., the noise portion "leaks" into the speech model).

* * *

The various methods as illustrated in the figures and described herein represent example embodiments of methods. The methods may be implemented in software, hardware, or a combination thereof. The order of method may be changed, and various elements may be added, reordered, combined, omitted, modified, etc. Various modifications and changes may be made as would be obvious to a person of ordinary skill in the art having the benefit of this specification. It is intended that the invention embrace all such modifications and changes and, accordingly, the above description to be regarded in an illustrative rather than a restrictive sense.

The invention claimed is:

1. A method, comprising:

performing, by one or more computing devices:

generating a source model for a sound source based, at least in part, on a training signal, the source model including a plurality of spectral dictionaries corresponding to the training signal, a given segment of the training signal being represented by a given one of the plurality of spectral dictionaries, the given segment of the training signal being less than the training signal in whole, each of the plurality of spectral dictionaries including at least one spectral component, and the source model further including probabilities of transition among the plurality of spectral dictionaries;

receiving a mixed signal including a combination of a signal of interest with a noise signal, the signal of interest being emitted by the sound source;

in response to receiving an instruction to separate the signal of interest from the noise signal, generating a mixture model for the mixed signal using, at least in part, the source model, the mixture model including a plurality of mixture weights corresponding to the combination of the signal of interest and the noise signal, and a spectral dictionary corresponding to the noise signal;

constructing a mask for the mixed signal based, at least in part, on the mixture model; and applying the mask to the mixture signal to separate the signal of interest from the noise signal.

2. The method of claim 1, wherein the source model is a non-negative hidden Markov model (N-HMM).

3. The method of claim 1, wherein the training signal is a spectrogram.

4. The method of claim 1, wherein the given segment of the training signal is represented by a linear combination of two or more spectral components of the given one of the plurality of spectral dictionaries.

5. The method of claim 1, wherein the signal of interest includes speech, and wherein the given segment includes a phoneme or a portion thereof.

6. The method of claim 1, wherein the probabilities of transition among the plurality of spectral dictionaries include a transition matrix.

7. The method of claim 1, wherein generating the mixture model includes generating the mixture model in the absence of training data for the noise signal, and wherein the spectral dictionary corresponding to the noise signal is a single spectral dictionary.

8. The method of claim 1, wherein the mixture model IS a non-negative factorial hidden Markov model (N-FHMM).

9. A tangible computer-readable storage memory having program instructions stored thereon that, upon execution by a computer system, cause the computer system to:

store a non-negative hidden Markov model (N-HMM) corresponding to a sound source, the N-HMM model being based, at least in part, on a training signal emitted by the sound source;

in response to receiving an instruction to separate sounds within a mixed signal, the mixed signal including a first sound emitted by the sound source and one or more other sounds emitted by one or more other sources, generate a non-negative factorial hidden Markov model (NF-HMM) model for the mixed signal based, at least in part, on the N-HMM model, the N-FHMM being generated in the absence of a training signal emitted by the one or more other sources;

construct a filter based, at least in part, on the N-FHMM model; and apply the filter in time and frequency as a spectrogram to the mixed signal to separate the first sound from the one or more other sounds.

10. The tangible computer-readable storage memory of claim 9, wherein the N-HMM model includes a plurality of spectral dictionaries, wherein each of the spectral dictionaries includes at least one spectral component.

11. The tangible computer-readable storage memory of claim 10, wherein a given segment of the training signal is represented by a linear combination of two or more spectral components of a given spectral dictionary.

12. The tangible computer-readable storage memory of claim 10, wherein the N-HMM model further includes a transition matrix that indicates probabilities of transition among the plurality of spectral dictionaries.

13. The tangible computer-readable storage memory of claim 9, wherein the first sound includes speech and the one or more other sounds include noise.

14. A system, comprising:

at least one processor; and a memory coupled to the at least one processor, the memory storing program instructions, and the program instructions being executable by the at least one processor to perform operations including:

receive a request to separate a selected signal from other signals mixed within a mixed signal;

in response to the request, generate a non-negative factorial hidden Markov model (N-FHMM) model for the mixed signal based, at least in part, on a non-negative hidden Markov model (N-HMM) model corresponding to the selected signal;

apply a filter in time and frequency as a spectrogram to the mixed signal to separate the selected signal from the other signals, the filter being constructed based, at least in part, on the N-FHMM model.

15. The system of claim 14, wherein the N-HMM model includes spectral dictionaries, wherein each of the spectral dictionaries includes at least one spectral component, and wherein the N-HMM model further includes a transition matrix that indicates probabilities of transition among the spectral dictionaries.

16. The system of claim 15, wherein the N-HMM model is created based on a training signal, and wherein a segment of the training signal is represented by a linear combination of two or more spectral components of a spectral dictionary corresponding to the segment.

17. The system of claim 16, wherein the selected signal includes speech and the other signals include noise.

18. The system of claim 17, wherein the segment includes a phoneme or a portion thereof

19. The system of claim 16, wherein the selected signal includes music and the other signals include noise.

20. The system of claim 17, wherein the segment includes a musical note or a portion thereof.

* * * * *